US011904446B2

(12) United States Patent
Carrier et al.

(10) Patent No.: US 11,904,446 B2
(45) Date of Patent: Feb. 20, 2024

(54) POWER DRIVING TOOL WITH LATCH POSITION SENSOR

(71) Applicant: Kyocera Senco Industrial Tools, Inc., Cincinnati, OH (US)

(72) Inventors: Alexander L Carrier, Columbus, OH (US); Derick C Robinson, Hillsboro, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 118 days.

(21) Appl. No.: 17/243,781

(22) Filed: Apr. 29, 2021

(65) Prior Publication Data

US 2021/0347023 A1 Nov. 11, 2021

Related U.S. Application Data

(60) Provisional application No. 63/021,156, filed on May 7, 2020.

(51) Int. Cl.
*B25C 1/00* (2006.01)
*B25C 1/06* (2006.01)

(52) U.S. Cl.
CPC ................ *B25C 1/008* (2013.01); *B25C 1/06* (2013.01)

(58) Field of Classification Search
CPC .. B25C 1/04; B25C 1/06; B25C 1/008; B25C 1/047
See application file for complete search history.

(56) References Cited

U.S. PATENT DOCUMENTS

| | | | |
|---|---|---|---|
| 860,536 | A | 7/1907 | Ellingham |
| 1,774,967 | A | 9/1930 | Ellis |
| 2,575,455 | A | 11/1951 | Lang |

(Continued)

FOREIGN PATENT DOCUMENTS

| | | |
|---|---|---|
| DE | 1503164 | 3/1970 |
| DE | 8711784 | 8/1987 |

(Continued)

OTHER PUBLICATIONS

Machine translation WO2021/176909 (Yasutomi) (Oct. 9, 2021) (Year: 2021).*

(Continued)

*Primary Examiner* — Joshua G Kotis
(74) *Attorney, Agent, or Firm* — Frederick H. Gribbell; Russell F. Gribbell

(57) ABSTRACT

A powered fastener driving tool including a latch with a position sensor, to detect the position of the driver during tool operation. The sensor communicates to the system controller, which determines, based on the position of the latch, if the motor should be energized or the motor braking energized. This latch sensor detection provides an accurate location of the driver to the system controller, helping prevent wear and tear on the lifter and driver, and increasing the life of the tool. The driver includes a plurality of through holes, in which the latch can engage when properly aligned. When the latch is engaged with a through hole, the sensor communicates to the controller than the motor may be energized. However, when the latch is not engaged with a through hole, the sensor communicates to the controller that the motor brake should be energized.

14 Claims, 18 Drawing Sheets

(56) References Cited

U.S. PATENT DOCUMENTS

| | | | | |
|---|---|---|---|---|
| 2,814,041 | A | 11/1957 | Haley | |
| 2,933,290 | A | 4/1960 | Ryder | |
| 3,589,588 | A | 6/1971 | Vasku | |
| 3,847,322 | A | 11/1974 | Smith | |
| 3,878,902 | A | 4/1975 | Matsuo | |
| 3,913,685 | A | 10/1975 | Enstrom | |
| 3,924,692 | A | 12/1975 | Saari | |
| 4,203,353 | A | 5/1980 | Bernham et al. | |
| 4,215,808 | A | 8/1980 | Sollberger et al. | |
| 4,530,455 | A | 7/1985 | Vomberger | |
| 4,741,518 | A | 5/1988 | Wallis | |
| 5,199,627 | A | 4/1993 | Christensen | |
| 5,503,319 | A | 4/1996 | Lai | |
| 5,605,268 | A | 2/1997 | Hayashi | |
| 5,720,423 | A | 2/1998 | Kondo et al. | |
| 6,533,156 | B1 | 3/2003 | Chang | |
| 6,705,503 | B1 | 3/2004 | Pedicini | |
| 6,938,811 | B2 | 9/2005 | Ehmig et al. | |
| 6,971,567 | B1 | 12/2005 | Cannaliato | |
| 6,997,367 | B2 | 2/2006 | Hu | |
| 7,040,521 | B2 | 5/2006 | Kolodziej et al. | |
| 7,225,961 | B1 | 6/2007 | Lee | |
| 7,225,962 | B2 | 6/2007 | Porth et al. | |
| 7,494,036 | B2 | 2/2009 | Shima | |
| 8,011,547 | B2 | 9/2011 | Leimbach et al. | |
| 8,267,297 | B2 | 9/2012 | Leimbach et al. | |
| 8,763,874 | B2 * | 7/2014 | McCardle | B25C 1/06 227/129 |
| 10,821,585 | B2 * | 11/2020 | Kabbes | B25C 1/008 |
| 10,821,586 | B2 * | 11/2020 | Wu | B25C 1/047 |
| 2003/0218042 | A1 | 11/2003 | Odoni et al. | |
| 2005/0217875 | A1 | 10/2005 | Forster | |
| 2006/0180631 | A1 | 8/2006 | Pedicini | |
| 2007/0007319 | A1 | 1/2007 | Simonelli | |
| 2007/0045377 | A1 | 3/2007 | Towfighi | |
| 2008/0041914 | A1 | 2/2008 | Simonelli | |
| 2008/0067213 | A1 | 3/2008 | Shima | |
| 2008/0190988 | A1 | 8/2008 | Pedicini | |
| 2009/0236387 | A1 * | 9/2009 | Simonelli | B25F 5/006 227/8 |
| 2014/0263535 | A1 | 9/2014 | Rajani | |
| 2018/0036870 | A1 | 2/2018 | Komazaki | |
| 2018/0126528 | A1 * | 5/2018 | Pomeroy | B25C 1/06 |
| 2018/0154505 | A1 | 6/2018 | Sato | |
| 2020/0114500 | A1 * | 4/2020 | Bierdeman | B25C 1/04 |
| 2020/0164498 | A1 * | 5/2020 | Wechselberger | B25C 1/047 |
| 2020/0238493 | A1 * | 7/2020 | Wierzchon | B25C 1/047 |
| 2021/0291335 | A1 * | 9/2021 | Liu | B25C 1/047 |

FOREIGN PATENT DOCUMENTS

| | | |
|---|---|---|
| GB | 1559571 | 1/1980 |
| JP | 201668221 | 5/2016 |
| WO | WO-2021176909 A1 * | 9/2021 |

OTHER PUBLICATIONS

International Search Report, PCT/US2021/029816, 9 pages (dated Jul. 28, 2021).

Two-page "Tool Assembly" drawing of Senco Model No. SN952XP pneumatic tool; dated Mar. 4, 2008; representative of earlier tools in public use before 2006; Admitted Prior Art.

One-page magnified view of "Tool Assembly" drawing of Senco Model No. SN952XP pneumatic tool; Mar. 4, 2008; representative of earlier tools in public use before 2006; Admitted Prior Art.

Sixteen page Operating Instructions for Senco AirFree 41 Cordless Finish Nailer; Sep. 7, 2001.

Four page Parts Reference Guide for Senco AirFree 41 Cordless Finish Nailer; 2004.

Four page Parts Reference Guide for Senco Cordless Finish 41 15 ga. Finish Nailer, 2008.

* cited by examiner

POWER DRIVING TOOL WITH LATCH POSITION SENSOR

CROSS-REFERENCE TO RELATED APPLICATIONS

The present application claims priority to provisional patent application Ser. No. 63/021,156, titled "POWER DRIVING TOOL WITH LATCH POSITION SENSOR," filed on May 7, 2020.

TECHNICAL FIELD

The technology disclosed herein relates to linear fastener driving tools and, more particularly, is directed to portable tools that drive staples, nails, or other linearly driven fasteners. The technology is specifically disclosed as a gas spring fastener driving tool, in which a cylinder filled with compressed gas is used to quickly force a piston through a driving stroke movement, while also driving a fastener into a workpiece. The piston is then moved back to its starting position by use of a rotary-to-linear lifter, which again compresses the gas above the piston, thereby preparing the tool for another driving stroke. A driver is attached to the piston, and has protrusions along its edges that are used to contact the lifter, which "lifts" the driver during a return stroke. A pivotable latch is controlled to move into either an interfering position or a non-interfering position with respect to special openings in the driver, and acts as a safety device, by preventing the driver from making a full driving stroke at an improper time. The latch also aids the lift for a lifter that is designed to rotate more than once, in a single return stroke.

The driver's movements are essentially detected by a latch position sensor, and the information provided by this latch position sensor is used to prevent the lifter from impacting against the driver in situations where the driver did not finish its driving stroke in a correct ("in specification") position. If the driver's protrusions are out of position (i.e., because the entire driver is out of position), then the lifter will not be able to contact the driver in a correct manner, and instead of lifting the driver back to its "ready position," the lifter's pins might contact the driver so as to jam against the driver, and potentially even break the driver or the lifter at the point of contact.

A first failure mode can occur if the piston stop has sufficiently worn to the point where the driver ends its driving stroke too low in the driver track. In other words, the "driven position" of the driver against the piston stop is out of specification, and is not at its anticipated "normal" ending position. One can expect this type of failure to eventually occur in virtually every such tool (if the tool is used as a "production device"), but these failures typically do not occur until a Senco tool has undergone tens or hundreds of thousands of operating cycles.

A second failure mode can occur if the driver is prevented from completing its driving stroke because of a fastener that becomes jammed in the fastener track of the guide body; this mechanical interference can prevent the driver from moving all the way to the bottom of its normal driving stroke. If this occurs, the ending driven position of the driver is again out of specification, and not at its anticipated "normal" ending position.

In an exemplary embodiment, the driver exhibits a plurality of through-holes (or openings) on its face that the latch can engage before a lifting stroke. If the latch position sensor detects that the latch is not engaged with one of the through-holes, then the sensor communicates this misalignment to the system controller. The system controller stops energizing the lifter motor, halting the lift stroke. However, if the latch does successfully engage one of the through-holes, then the latch position sensor communicates this engaged position to the system controller. The system controller then energizes (or continues to energize) the lifter motor, which begins (or continues) the lift stroke.

Note that, in the illustrated embodiment herein, there are multiple driver openings, and if the driver stops short of its normal ending position, it still is possible for the latch to successfully engage one of those driver openings, even if that is not the typical opening that would be engaged if the driver did have a normal driving stroke and it stopped at its normal ending position. In the illustrated embodiment, the driver openings and the driver's multiple protrusions are configured such that the lifter can successfully engage a different driver protrusion and begin a lifting stroke, so long as the latch has successfully engaged one of those driver openings. This action, by itself, may clear a jammed fastener, and hence, the tool could then continue to operate. The lifter-driver system is designed to allow for an "over-lift," and therefore, no harm will come to the tool if the lifting stroke begins with the driver at a higher position than normal, in this scenario.

In a preferred embodiment, the latch position sensor is a magnetic field sensor (such as a Hall-effect sensor, for example). The latch includes an embedded magnet, so that if the latch is properly engaged in a driver through-hole, then the latch position sensor detects this latch magnet. When the latch is misaligned, the latch position sensor cannot detect the latch's magnet.

It should be noted that the recommended position sensors are "non-contact" devices, and thus should operate inside the overall tool without any mechanical wear. Other types of proximity detecting sensors could be used, if desired, without departing from the principles of this technology. A sensor that makes actual physical contact could be used, but is not recommended for this engineering application.

STATEMENT REGARDING FEDERALLY SPONSORED RESEARCH OR DEVELOPMENT

None.

BACKGROUND

An early air spring fastener driving tool is disclosed in U.S. Pat. No. 4,215,808, to Sollberger. The Sollberger patent used a rack and pinion-type gear to "jack" the piston back to its driving position. A separate motor was to be attached to a belt that was worn by the user; a separate flexible mechanical cable was used to take the motor's mechanical output to the driving tool pinion gear, through a drive train.

Another air spring fastener driving tool is disclosed in U.S. Pat. No. 5,720,423, to Kondo. This Kondo patent used a separate air replenishing supply tank with an air replenishing piston to refresh the pressurized air needed to drive a piston that in turn drove a fastener into an object.

Another air spring fastener driving tool is disclosed in published patent application no. US2006/0180631, by Pedicini, which uses a rack and pinion to move the piston back to its driving position. The rack and the pinion gear are decoupled during the drive stroke, and a sensor is used to detect this decoupling. The Pedicini tool uses a release valve to replenish the air that is lost between nail drives.

Kyocera Senco Industrial Tools, Inc. sells a product line of automatic power tools referred to as nailers, including tools that combine the power and the utility of a pneumatic tool with the convenience of a cordless tool. One primary feature of such tools is that they use pressurized air to drive a piston that shoots the nail. In some Senco tools, that pressurized air is re-used, over and over, so there is no need for any compressed air hose, or for a combustion chamber that would require fuel.

Although Senco "air tools" are quite reliable and typically can endure thousands of shooting cycles without any significant maintenance, they do have wear characteristics for certain components. For example, the piston stop can degrade over time, and when that occurs, the piston and driver can end up at a lower position than is desired, at the end of a drive stroke. If the out of position situation reaches more than a minimum specified distance, then the lifter that brings the driver back to its ready position may not properly engage the "teeth" of the driver, and instead may jam against the driver, or perhaps even break the driver due to forceful mechanical contact, without being able to move the driver up toward its ready position, as is desired.

Another undesirable situation is when a fastener becomes hard-jammed within the driver track of the tool such that the driver also jams, part-way down the driver track. If that occurs, the driver will likely be out of position (not within its nominal specifications), and the lifter pins could make undesirable contact with the driver, not only further jamming the mechanical components of the tool, but potentially contacting the driver with enough force that it could break the driver.

Yet another undesirable situation is when a fastener becomes jammed or otherwise stalled within the driver track of the tool. If that occurs, the user may not realize it, especially if the user is performing multiple quick driving cycles, which is normal for many production and construction situations. So, if a fastener has not been properly exited from the driver track, then the next driving cycle will potentially cause a problem when the driver comes down the driver track and contacts the stalled or jammed previous fastener. This condition can jam the driver, and potentially cause a situation where the lifter pins could make undesirable contact with the driver, not only further jamming the mechanical components of the tool, but potentially contacting the driver with enough force that it could break the driver.

SUMMARY

Accordingly, it is an advantage of the present technology disclosed herein to provide a fastener driving tool that includes at least one latch position sensor for determining the location of the driver.

It is another advantage of the present technology to provide a fastener driving tool having at least one latch position sensor for determining whether or not the driver member ends its driving stroke at a correct position that is within specification.

It is a further advantage of the present technology to provide a fastener driving tool having at least one latch position sensor to determine the ending position of the driver member after a driving stroke, and having a dynamic braking circuit to prevent the lifter subassembly from impacting the driver member with a force that might jam or break the driver member.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a driver machine configured for use in a fastener driving tool is provided, which comprises: (a) a hollow cylinder having a movable piston therewithin; (b) a guide body that is sized and shaped to receive a fastener that is to be driven; (c) an elongated driver that is in mechanical communication with the piston, the driver being sized and shaped to push the fastener from an exit portion of the guide body, the driver extending from a first end to a second end and having an elongated face therebetween, the first end being proximal to the piston, the second end being distal from the piston and making contact with the fastener during a driving stroke, the driver exhibiting a plurality of protrusions at first predetermined locations in a surface of the driver; the driver having a plurality of openings at second predetermined locations in the surface of the driver; (d) a movable lifter that moves the driver toward a ready position during a return stroke; (e) a movable latch that is in mechanical communication with the driver during the return stroke, the latch being biased to engage the plurality of openings under predetermined conditions; (f) a magnet mounted to the latch; (g) a magnetic sensor mounted proximal to the latch; and (h) a system controller comprising: (i) a processing circuit, (ii) a memory circuit including instructions executable by the processing circuit, (iii) an input/output interface (I/O) circuit, the I/O circuit being in communication with the magnetic sensor so that an output signal produced by the magnetic sensor is signal-conditioned as a latch position signal when received at the processing circuit; (i) wherein: the system controller is configured to detect a position of the latch after the driving stroke and: (i) if the latch has moved to a first predetermined position, then the magnetic sensor will detect the magnet, and the return stroke will be permitted to occur; and (ii) if the latch has not moved to the first predetermined position, then the magnetic sensor will fail to detect the magnet, and the return stroke will be prevented from occurring.

In accordance with another aspect, a latch system for a driving machine configured for use in a fastener driving tool is provided, which comprises: (a) an elongated driver, the driver extending from a first end to a second end and having an elongated face therebetween, the driver exhibiting a plurality of protrusions at first predetermined locations in a surface of the driver; the driver having a plurality of openings at second predetermined locations in the surface of the driver; (b) a movable lifter that moves the driver toward a ready position during a return stroke; (c) a movable latch that is in mechanical communication with the driver during the return stroke, the latch being biased to engage the plurality of openings under predetermined conditions, the latch including a detection zone at a predetermined location on at least a portion of the latch; (d) a latch position sensor capable of sensing the detection zone of the latch; and (e) a system controller comprising: (i) a processing circuit, (ii) a memory circuit including instructions executable by the processing circuit, (iii) an input/output interface (I/O) circuit, the I/O circuit being in communication with the latch position sensor so that an output signal produced by the latch position sensor is signal-conditioned as a latch position signal when received at the processing circuit; (f) wherein: the system controller is configured to determine a position of the latch after a driving stroke and: (i) if the latch has moved to a first predetermined position, then the latch position sensor will detect the detection zone, and the return stroke will be permitted to occur; and (ii) if the latch has not moved to the first predetermined position, then the latch position sensor will fail to detect the detection zone, and the return stroke will be prevented from occurring.

In accordance with yet another aspect, a method for operating a driving machine configured for use in a fastener driving tool is provided, in which the method comprises the following steps: (a) providing an elongated driver, the driver extending from a first end to a second end and having an elongated face therebetween, the driver exhibiting a plurality of protrusions at first predetermined locations in a surface of the driver; the driver having a plurality of openings at second predetermined locations in the surface of the driver; (b) providing a movable lifter that moves the driver toward a ready position during a return stroke; (c) providing a movable latch that is in mechanical communication with the driver during the return stroke, the latch being biased to engage the plurality of openings under predetermined conditions, the latch including a detection zone at a predetermined location on at least a portion of the latch; (d) providing a latch position sensor capable of sensing the detection zone of the latch; (e) providing a system controller that includes: (i) a processing circuit, (ii) a memory circuit including instructions executable by the processing circuit, (iii) an input/output interface (I/O) circuit, the I/O circuit being in communication with the latch position sensor so that an output signal produced by the latch position sensor is signal-conditioned as a latch position signal when received at the processing circuit; (f) inspecting a position of the latch after a driving stroke; and (g) determining if the latch has moved to a first predetermined position, using the latch position sensor to detect the detection zone, and (i) if so, then permitting the return stroke to occur; (ii) if not, then preventing the return stroke from occurring.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
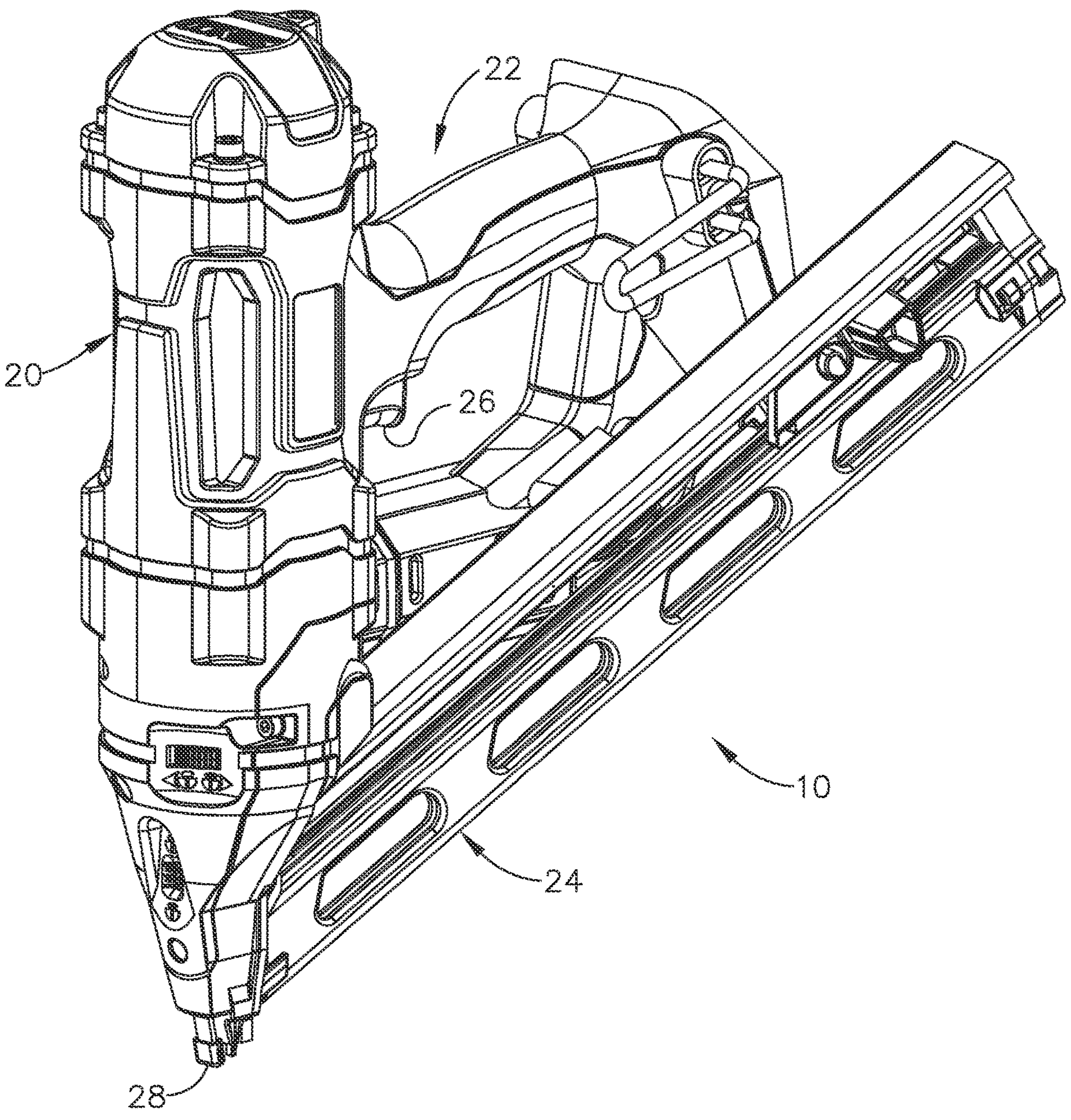
FIG. 1 is a front perspective view of a fastener driving tool, constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms “connected” or “coupled” and variations thereof are not restricted to physical or mechanical connections or couplings. Furthermore, the terms “communicating with” or “in communications with” refer to two different physical or virtual elements that somehow pass signals or information between each other, whether that transfer of signals or information is direct or whether there are additional physical or virtual elements therebetween that are also involved in that passing of signals or information. Moreover, the term “in communication with” can also refer to a mechanical, hydraulic, or pneumatic system in which one end (a “first end”) of the “communication” may be the “cause” of a certain impetus to occur (such as a mechanical movement, or a hydraulic or pneumatic change of state) and the other end (a “second end”) of the “communication” may receive the “effect” of that movement/change of state, whether there are intermediate components between the “first end” and the “second end,” or not. If a product has moving parts that rely on magnetic fields, or somehow detects a change in a magnetic field, or if data is passed from one electronic device to another by use of a magnetic field, then one could refer to those situations as items that are “in magnetic communication with” each other, in which one end of the “communication” may induce a magnetic field, and the other end may receive that magnetic field, and be acted on (or otherwise affected) by that magnetic field.

The terms “first” or “second” preceding an element name, e.g., first inlet, second inlet, etc., are used for identification purposes to distinguish between similar or related elements, results or concepts, and are not intended to necessarily imply order, nor are the terms “first” or “second” intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term “circuit” as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific “circuit” that could be called a “demodulation circuit;” however, there would be a demodulation “function” that is performed by the software. All of these possibilities are contemplated by the inventors, and are within the principles of the technology when discussing a “circuit.”

Referring now to FIG. 1, a first embodiment of a fastener driving tool is generally designated by the reference numeral 10. This tool 10 is mainly designed to linearly drive fasteners such as nails and staples. The tool 10 includes an outer housing 20, a handle portion 22, a magazine portion 24 for holding fasteners, an exit portion 28, and a trigger 26. The tool 10 also includes a motor 40 (see FIG. 2), which acts as a prime mover for the tool. A battery pack may be attached near the rear of the handle portion 22, and this battery provides electrical power for the motor 40 as well as for the control system.

Figure 2:
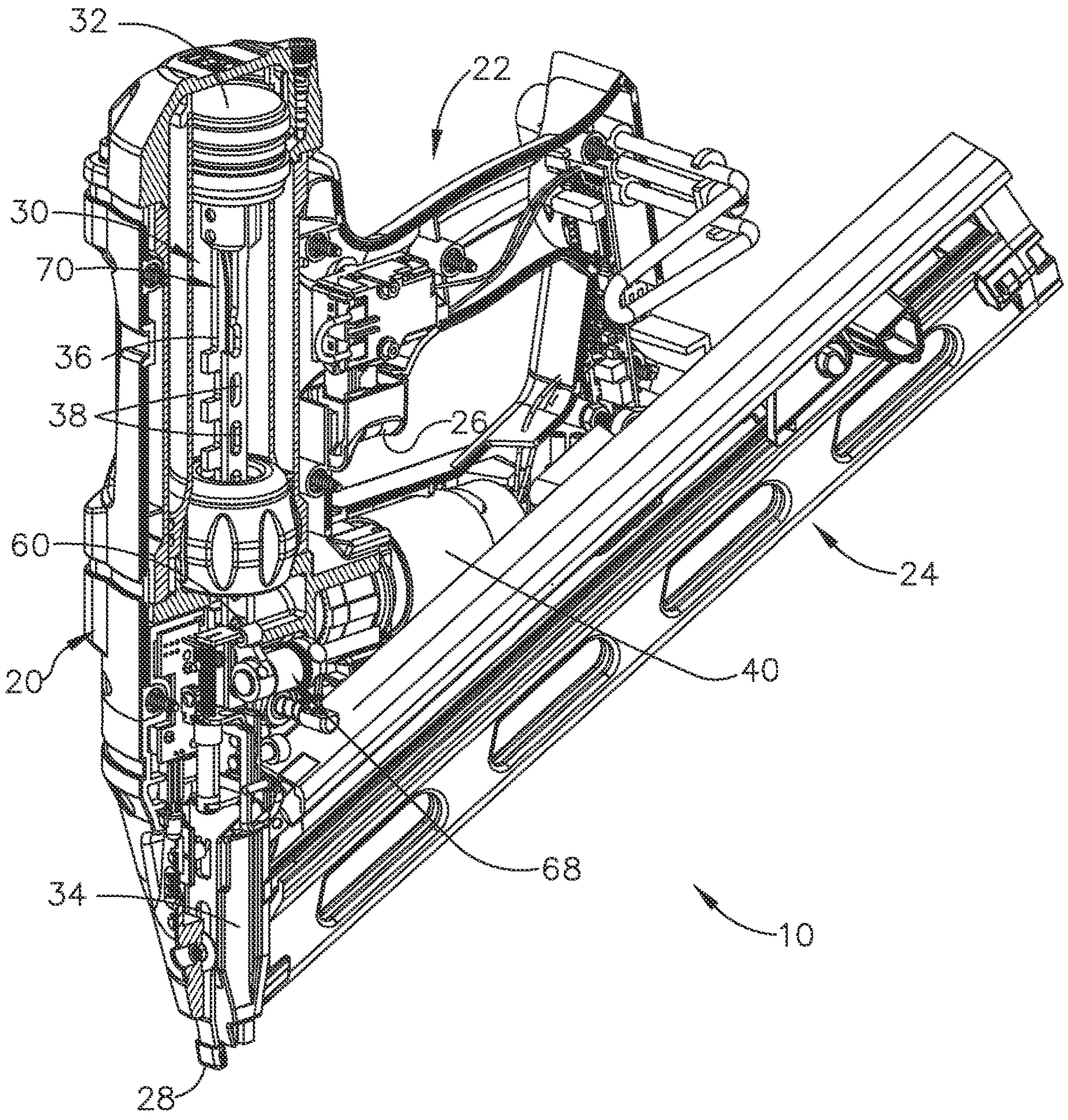
FIG. 2 is a front perspective view, in partial cut-away, showing the driver and latch of the fastener driving tool of FIG. 1.

Referring now to FIG. 2, a driver machine subassembly (“S/A”) is generally designated by the reference numeral 70. (See FIG. 8 for the best view of this driver machine S/A 70.) The driver machine S/A 70 includes a piston 32, an elongated driver 36, and a latch subassembly (“S/A”) 68. Note that the piston 32 is contained within a hollow cylinder 30, and this cylinder 30 also contains pressurized gas above the piston. When a user pulls the trigger 26, this pressurized gas forces the piston 32 to drive a fastener into a substrate. The tool 10 also includes a printed circuit board that contains a controller 50 (see FIG. 7).

One potential problem with this type of mechanism is the possibility of the driver stopping at a position that is out of specification, and, if that occurs, the lifter may have trouble engaging the driver teeth, such that the driver cannot be properly lifted back to its ready position. In some situations, the driver ends up in a position in which the mechanical “pins” of the lifter end up impacting directly against the “driver teeth” and, in that situation, these mechanical components can jam together; and under more severe conditions, the rotary motion of the lifter pins impacting the driver teeth at an inappropriate place may actually break the driver at the point of contact.

In view of these potential operating conditions that can be out of specification, a latch position sensor 170 has been designed to detect if the latch has properly engaged with the driver. Note that the latch is designed to “catch” the driver at times when the driver should not be allowed to move through an entire driving stroke, as discussed below.

A guide body 34 constrains the driver 36 during a “driving stroke.” The guide body 34 helps line up the driver 36 with a fastener from the magazine 24 that is to be driven into a substrate. The driver 36 has a plurality of openings 38 (or “through holes”) on one of its faces into which a movable latch 60 (also referred to as “pivotable latch”) may engage. The opening 38 is illustrated as an oval (see FIG. 8 for the best view), which is a preferred shape for this opening, rather than a circle. Of course, other shapes could be used, such as a rectangle, although that may be more difficult to machine than the oval that is illustrated in FIG. 2.

The movable latch 60 is part of the latch S/A 68 (see FIG. 8), which also includes a latch magnet 62, a latch position sensor 170, a spring-loaded plunger 66 (which biases the latch 60 towards the driver 36), and a solenoid 164. Note that the latch magnet 62 is embedded inside a small cylindrical portion of the latch 60. When the solenoid 164 is activated, the plunger 66 is retracted, thereby pulling the latch 60 away from the driver 36. The solenoid 164 is only activated when the user is pulling the trigger 26 and the tool 10 is about to drive a fastener.

Figure 3:
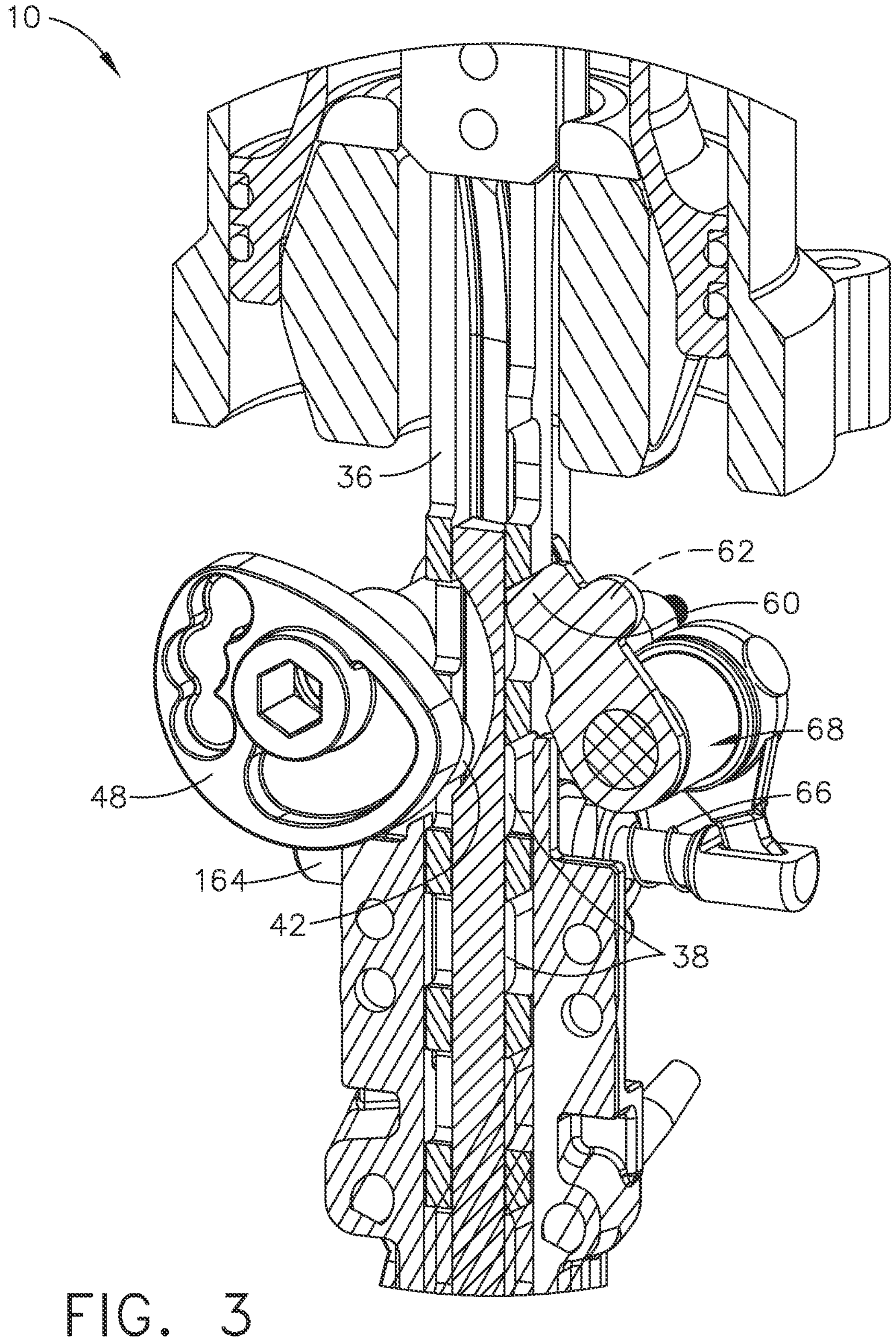
FIG. 3 is a front perspective view, in partial cut-away, showing a properly-aligned latch that is engaged in a through-hole in the driver of the fastener driving tool of FIG. 1.

Referring now to FIG. 3, the latch 60 is in an “engaged position.” In other words, the latch 60 has successfully engaged one of the plurality of openings 38. Note that one of a plurality of lifter pins 42 is shown, including (optionally) a roller 44 (see FIG. 10). In this "engaged" mode of operation, the driver can be lifted, due to the electronic control system, as described below.

Figure 4:
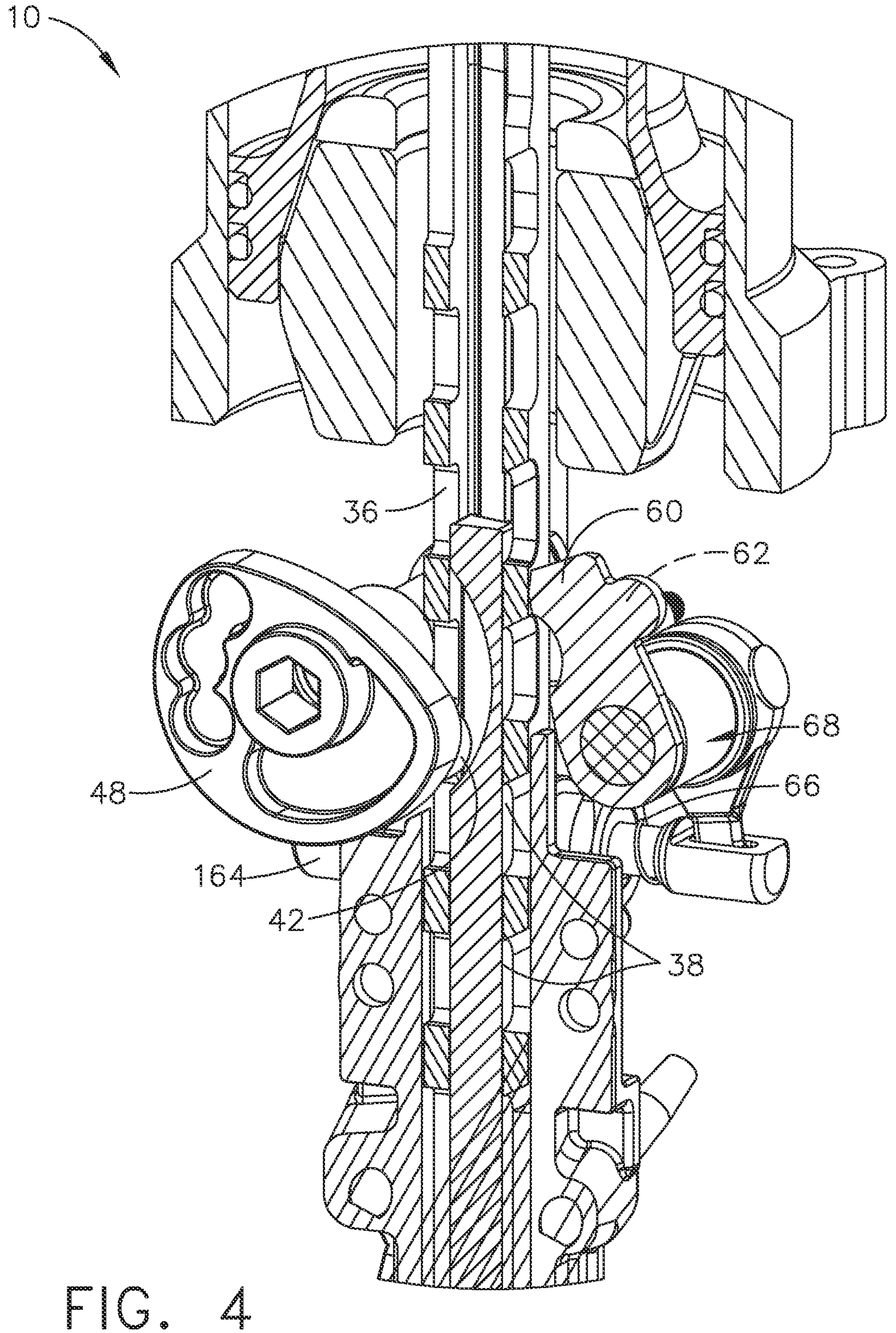
FIG. 4 is a front perspective view, in partial cut-away, showing the latch misaligned with a driver through-hole of the fastener driving tool of FIG. 1.

Referring now to FIG. 4, in this view the latch 60 has not successfully engaged one of the plurality of openings 38. This unsuccessful engagement is referred to herein as the "misaligned position." Note that the latch has not failed; quite the opposite—the misaligned latch cannot perform its typical function because the driver stopped at an improper position, also referred to as an "out of specification" position, as described below in greater detail. If this occurs after the driver has undergone a driving stroke, then the lifter will not be able to successfully engage the driver to force the driver to undergo a return stroke. Indeed, such a misaligned position could cause the lifter to literally break the driver, if that lifting function is not prevented from occurring. And note that it is the driver being out of position that causes this situation, not the latch.

In "normal" operating conditions, a rotatable lifter 48 is used to engage a plurality of driver protrusions 46 (also referred to as "driver teeth") (see FIG. 8), which returns (or "lifts") the driver 36 to a "ready position." The lifter 48 includes the plurality of lifter pins 42, which engage the driver teeth 46 during a lift stroke. Optionally, rollers 44 (see FIG. 10) may be mounted on the lifter pins 42 to help the lifter 48 more smoothly rotate and engage with the driver teeth 46.

Figure 8:
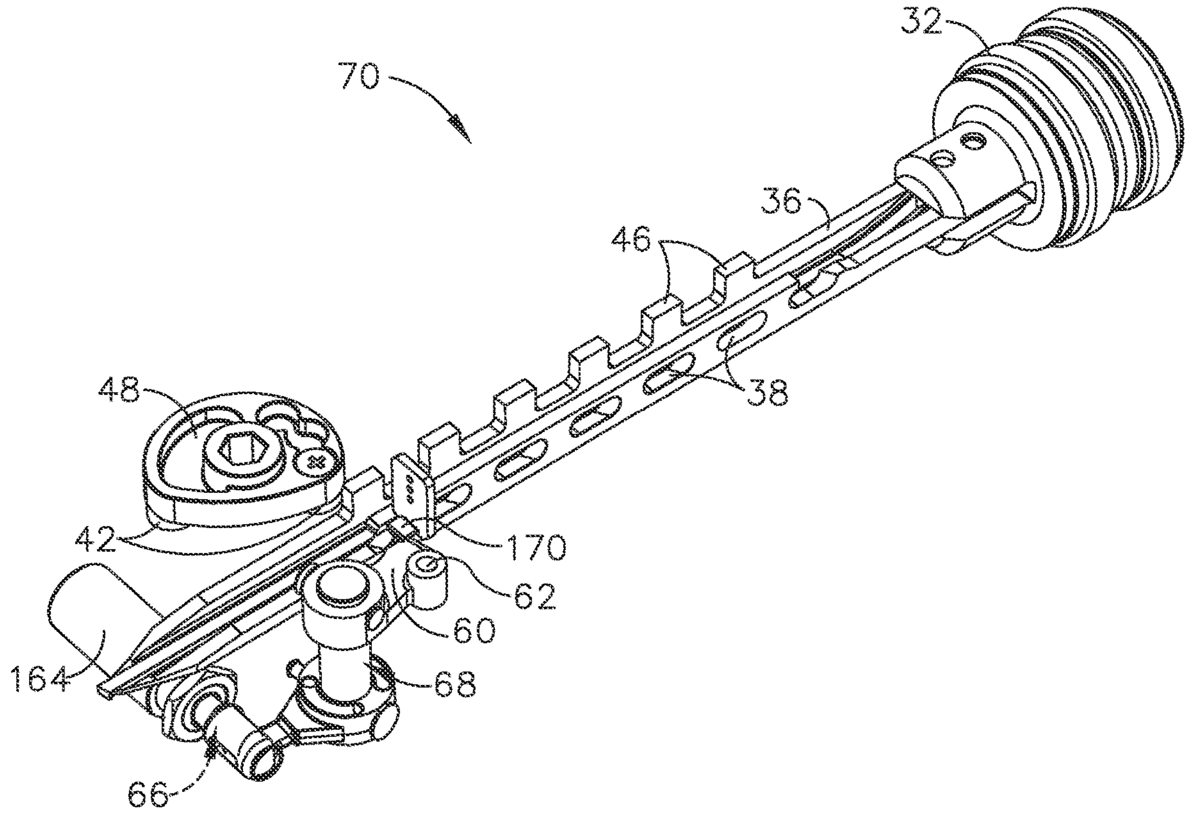
FIG. 8 is a perspective view of the piston, driver, lifter, and latch, depicting an energized solenoid position of the fastener driving tool of FIG. 1.

Driver 36 is rather elongated, and as an individual element can best be seen in FIG. 8. The main body of its elongated face is substantially rectangular. There are multiple protrusions or teeth 46 that are positioned along one of the longitudinal edges of the driver. In the illustrated embodiment, these teeth 46 protrude in a transverse direction from the longitudinal centerline of driver 36, and they are spaced-apart from one another along the outer longitudinal left edge of the driver 36. The positions of teeth 46 are clearly illustrated in FIG. 8. It will be understood that the precise positions for the teeth 46 could be at different locations from those illustrated for the driver 36, without departing from the principles of the technology disclosed herein.

Figure 5:
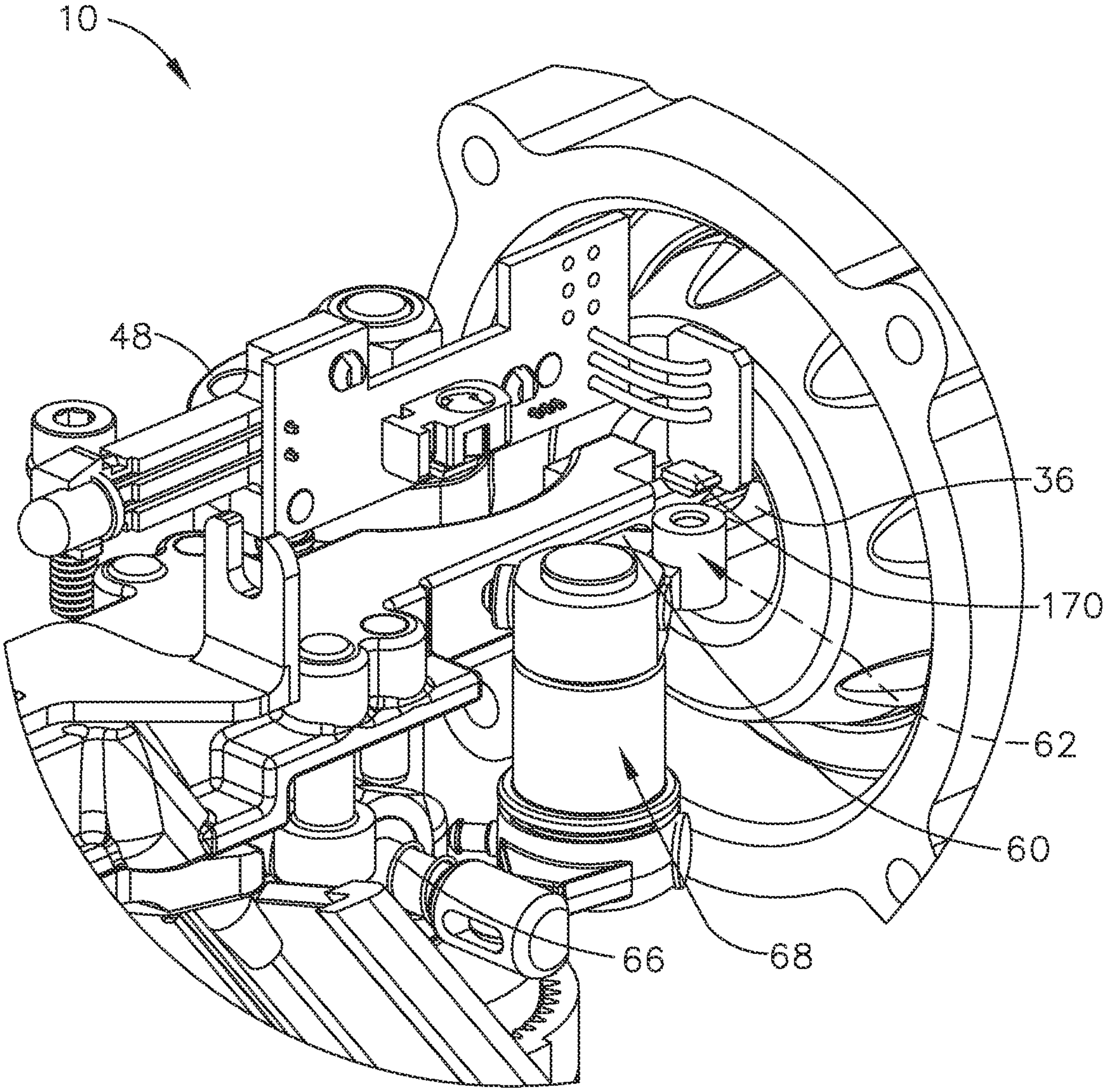
FIG. 5 is a side perspective view, in partial cut-away, showing the latch position sensor and a properly-aligned latch engaged with a driver through-hole of the fastener driving tool of FIG. 1.

Referring now to FIG. 5, the latch 60 is depicted in the engaged position. Note that a latch position sensor 170 is illustrated above the latch 60 (in this view). The latch position sensor 170 detects the latch 60 based on the location of the latch magnet 62. The latch position sensor may be a Hall-effect sensor, for example, or it may be another type of magnetic sensor. If the latch position sensor 170 detects the latch magnet 62, then the sensor 170 communicates a signal to the system controller 50, which then infers that the driver 36 is in the proper position.

It will be understood that the latch position sensor may be any variety of sensor type as long as it can reliably detect the position of the latch, and preferably is of a non-contact type sensor. Certainly, an optical sensor could be used to detect the movements of a specific portion of the latch, such as a protruding tab, for example. The sensor would typically be "looking for" some type of "detection zone" on the movable latch, and that detection zone may well be at a different location on the latch itself, depending on the type of sensor that is being used as the "latch position sensor" to perform these functions. The main basic types of sensors that are recommended include a magnetic sensor, an optical sensor, a metal-detecting proximity sensor; and a limit switch. Most of these types of sensors typically are non-contact sensors.

Figure 6:
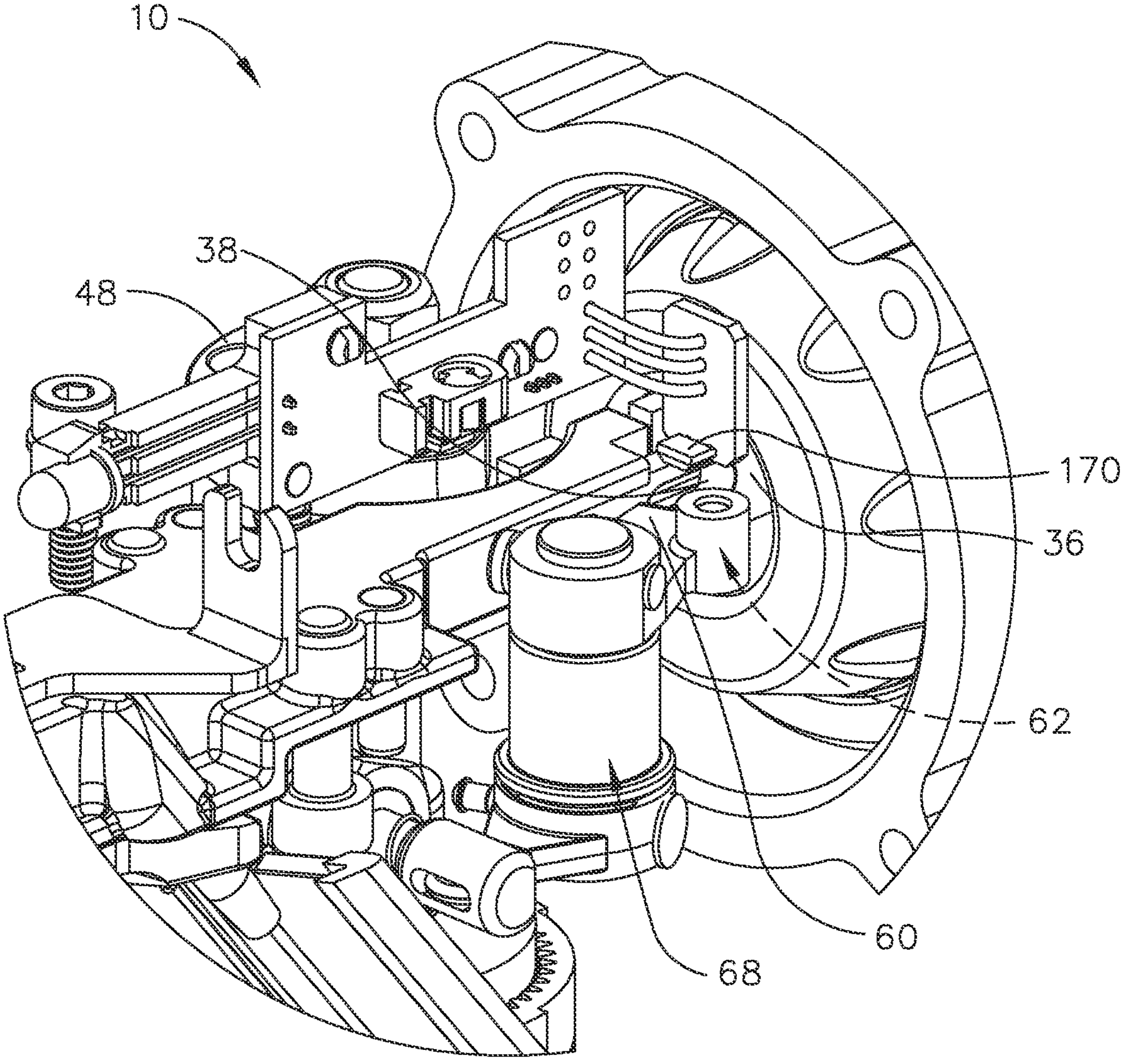
FIG. 6 is a side perspective view, in partial cut-away, showing the latch position sensor and the latch misaligned with a driver through-hole of the fastener driving tool of FIG. 1.

Referring now to FIG. 6, the latch 60 is depicted in the misaligned position. Note that, in this orientation, the latch magnet 62 is not beneath the latch position sensor 170. In this situation, since the sensor 170 cannot detect the latch magnet 62, the sensor 170 communicates a signal to the system controller 50 that the driver 36 is not in the proper position. These sensor (or latch) "states," and how the system deals with them, will be discussed in greater detail below (see FIGS. 17-18).

Latch Positions

In order to better understand the latch sensor concept, a brief discussion describing the various latch states is warranted. The concept of the latch is first and foremost a safety concept. The latch engages the driver so that the tool cannot drive a fastener unless it is safe for a human user. The latch also holds the driver in the ready position, or any other position in which the latch has engaged an opening, in other words, the latch is in mechanical communication with the driver. This mechanical communication allows the latch to be used as a driver position indicator. Three basic positions of the latch are described below, illustrating this driver position indicator/latch sensor concept.

The first latch position occurs when the solenoid is energized, and the latch is moved out of the way of the driver. The solenoid retracts the spring-loaded plunger, which pulls the latch away from the driver, thereby leaving the driver unimpeded by the latch. Note that the spring is mounted in a way to bias the latch towards the driver when the solenoid is not energized. This "energized position" is used only when driving a fastener. Note that this first position is not detected by the controller, in the illustrated embodiment.

The second latch position occurs when the latch successfully engages with one of the driver openings. This is the "engaged position." In this second position, the latch sensor will communicate to the controller that it is safe to lift the driver. Therefore, the controller will engage the motor and lift the driver back to the ready position. (See the flow chart logic of FIGS. 17 and 18.)

However, the third latch position can be the most important, which occurs when the latch has not successfully engaged one of the driver openings (the "misaligned position"). This third latch position may occur after a user has pulled the trigger. The system controller energizes the lifter motor which causes the lifter to slightly rotate. Then the system controller waits to detect the latch, and if it does not the lifter motor is de-energized. At this point, the LEDs blink indicating a jam. (Again, see the flow chart logic.) Alternatively, as noted above, if the latch ends up in a misaligned position after the driver has undergone a driving stroke, that means that the latch is attempting to do its job, but that it cannot—because the driver is mispositioned. The latch position sensor will detect this situation, and its job is then to prevent the lifter from engaging the driver. In such a circumstance, the misaligned latch and its associated latch position sensor will indeed be performing a primary function, which is to keep the tool from potentially being damaged.

Figure 7:
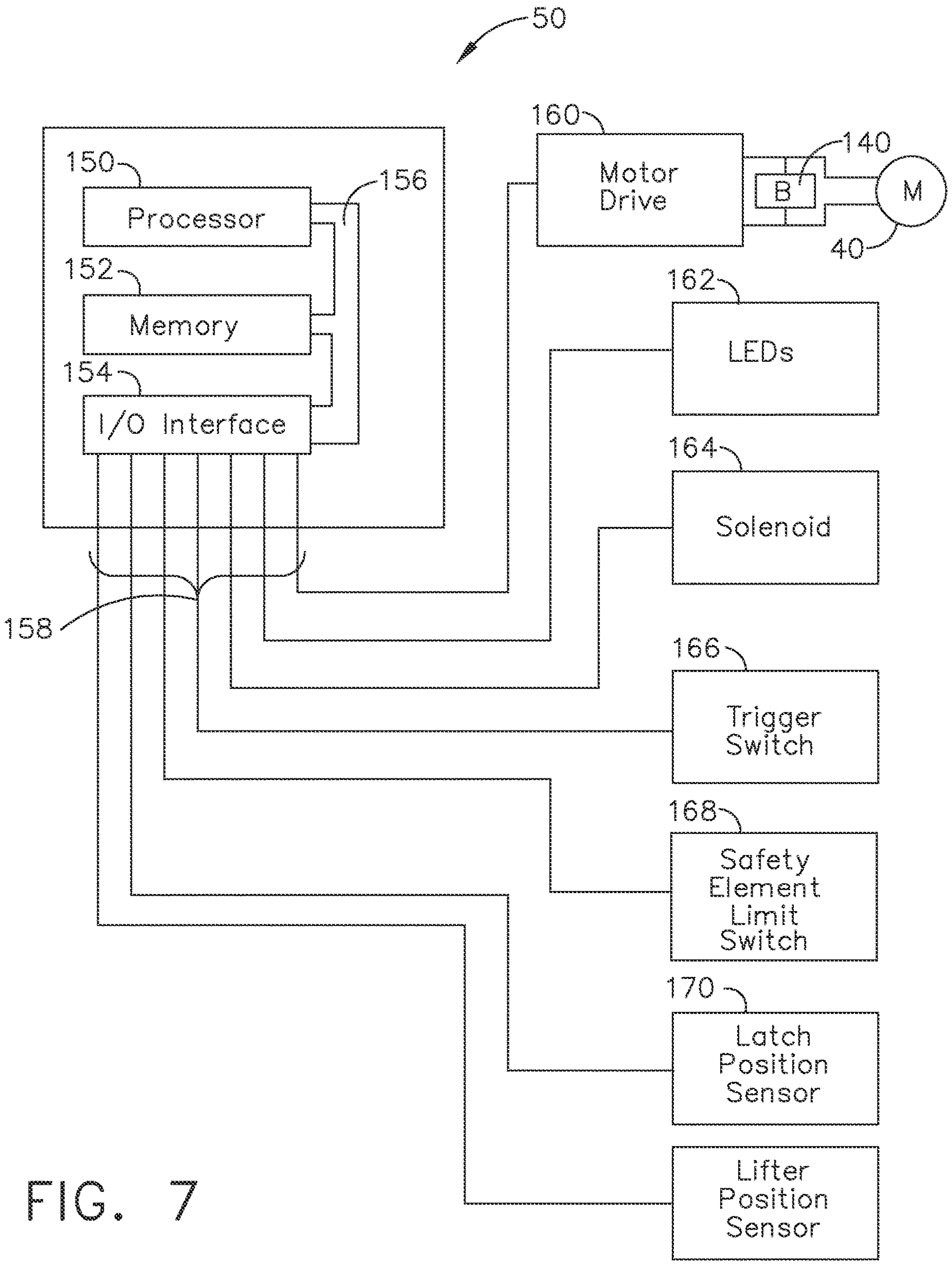
FIG. 7 is a block diagram showing some of the major electronic and electrical components for the fastener driving tool of FIG. 1.

Referring now to FIG. 7, a printed circuit board that contains the controller is generally designated by the reference numeral 50. A trigger switch 166 (which sense the position of the trigger) provides an input to the control system 50. There are also other input devices used with the system controller, including a safety element position sensor 168, and the latch position sensor 170.

The tool's system controller will typically include a microprocessor or a microcomputer integrated circuit 150 that acts as a processing circuit. At least one memory circuit 152 will also typically be part of the controller, including Random Access Memory (RAM) and Read Only Memory (ROM) devices. To store user-inputted information (if applicable for a particular tool model), a non-volatile memory device would typically be included, such as EEPROM, NVRAM, or a Flash memory device.

The processing circuit 150 communicates with external inputs and outputs, which it does by use of an input/output interface circuit 154. The processing circuit 150, memory circuit 152, and the interface (I/O) circuit 154 communicate with one another via a system bus 156, which carries address lines, data lines, and various other signal lines, including interrupts.

I/O circuit 154 has the appropriate electronics to communicate with various external devices, including input-type devices, such as sensors and user-controlled switches, as well as output-type devices, such as a motor and indicator lamps. The signals between the I/O interface circuit 154 and the actual input and output devices are carried by signal pathways, typically a number of electrical conductors, grouped under the general designation 158 on FIG. 7.

Some of the output devices include a lifter motor 40 (also referred to as "M"), a brake circuit 140 (also referred to as "B"), and one or more light emitting diodes 162 (also referred to as "LEDs"). Each of the output devices will typically have a driver circuit, such as a motor driver circuit 160 for the lifter motor 40. The position of the latch 60 is controlled by an electromechanical device, such as a solenoid or a motor, as desired by the system designer.

The input devices for the tool 10 can include various sensors, including the trigger switch 166, safety contact element switch 168, and the latch position sensor 170. If the switches 166 and 168 are standard electromechanical devices (such as limit switches), then typically no driver circuit is necessary. However, if the trigger switch and safety element switch comprise solid state sensing elements, then some type of interface circuit could be needed, and those circuits are included on FIG. 7 in the reference numerals 166 and 168, respectively.

The tool 10 also includes a position sensor that can detect (or infer) certain physical positions of the driver 36. As discussed above, this sensor is referred to as the latch position sensor 170. As noted above, it is desired that this sensor is a "non-contact" device, and in the illustrated embodiment, this sensor is a magnet sensor.

Additional input and output devices could be included with the fastener driving tool 10, if desired. For example, a small display could be added, to show certain information about usage or the condition of the tool. Other types of sensing devices or output devices could also be added, if desired by the system designer, without departing from the principles of the technology disclosed herein.

Figure 9:
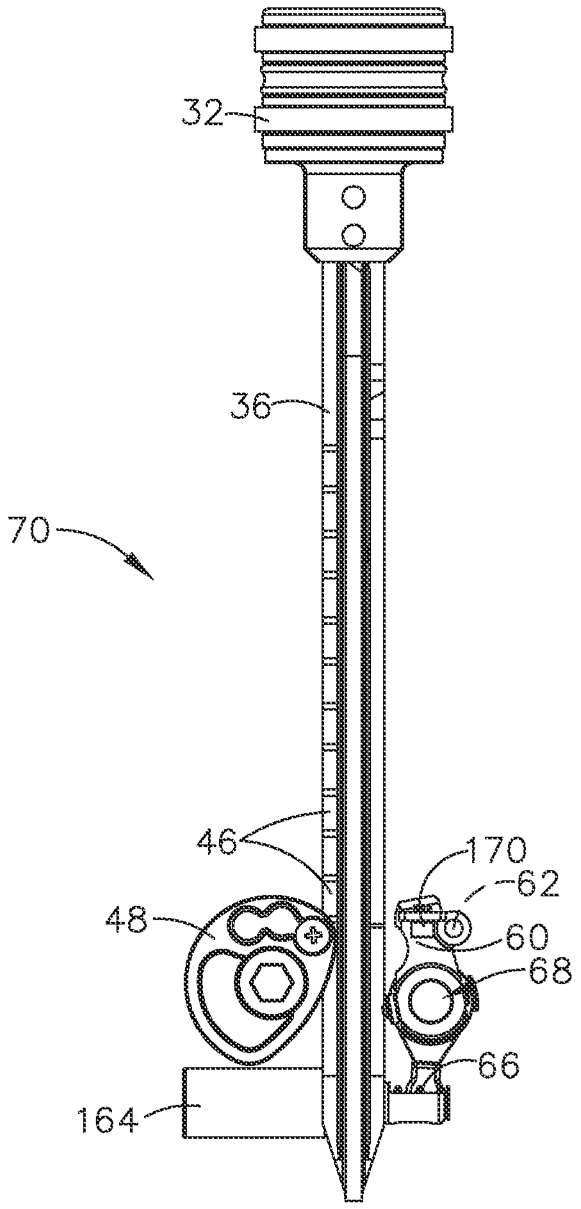
FIG. 9 is a front elevational view of the piston, driver, lifter, and latch, depicting an energized solenoid position of the fastener driving tool of FIG. 1.
Figure 10:
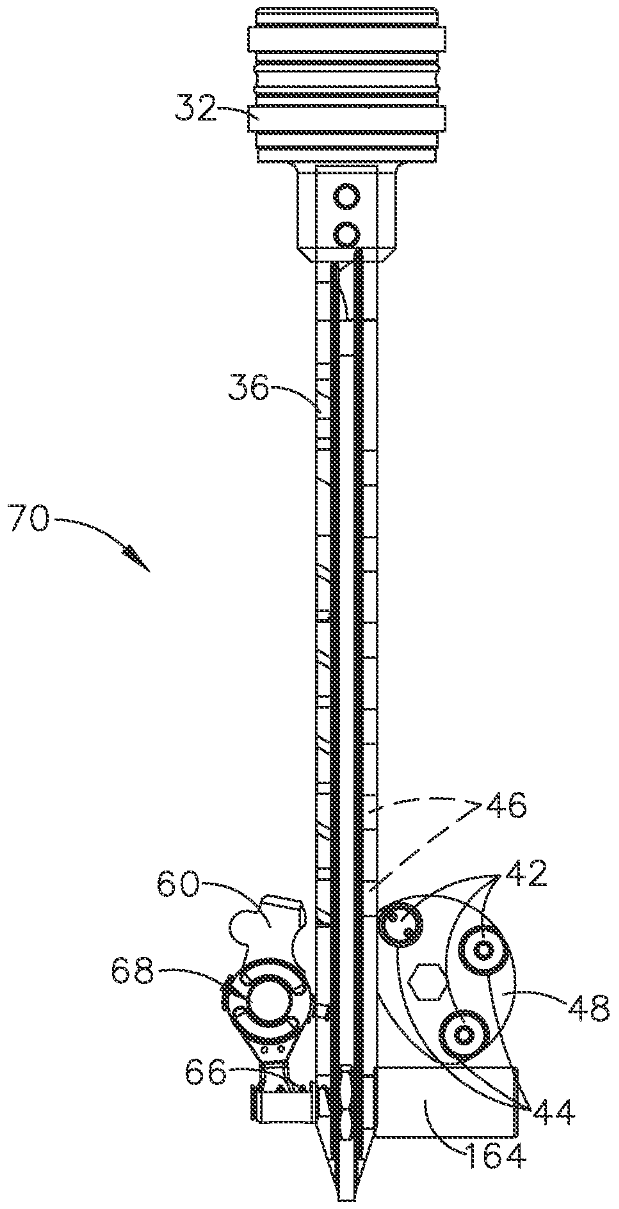
FIG. 10 is a rear elevational view of the piston, driver, lifter, and latch, depicting an energized solenoid position of the fastener driving tool of FIG. 1.

Referring now to FIGS. 8-10, the driver machine S/A 70 is in a "ready to fire" position (the "ready" position). The plurality of openings 38 and the driver protrusions 46 are clearly depicted. Note that the movable latch 60 has been moved away from the driver 36. In this view, the solenoid 164 is energized, which causes the solenoid plunger 66 to retract, thereby also retracting the latch 60 away from the driver 36. In this operating state, the latch magnet 62 is not in a detectable range of the latch sensor 170 (in this retracted position) and, as noted above, this would cause a misaligned position alert if the controller was not already programmed to ignore this solenoid energized state.

The retracted state of the latch 60 is also clearly visible in FIG. 9. Note that the latch sensor 170 is not directly over the latch magnet 62. FIG. 10 depicts a clear view of one of the lifter pins 42 holding a driver tooth 46. In the longer-term ready condition (or "state"), the latch 60 would also be engaged in one of the plurality of openings 38 to help secure the driver 36. However, in this "just about to drive" ready condition depicted in FIG. 10, since the latch 60 has disengaged from the driver, the lifter 48 merely needs to rotate a bit more to push the driver 36 up a very small amount until the driver tooth 46 clears that lifter pin 42, and then the tool performs a driving stroke and drives a fastener into a substrate.

Figure 11:
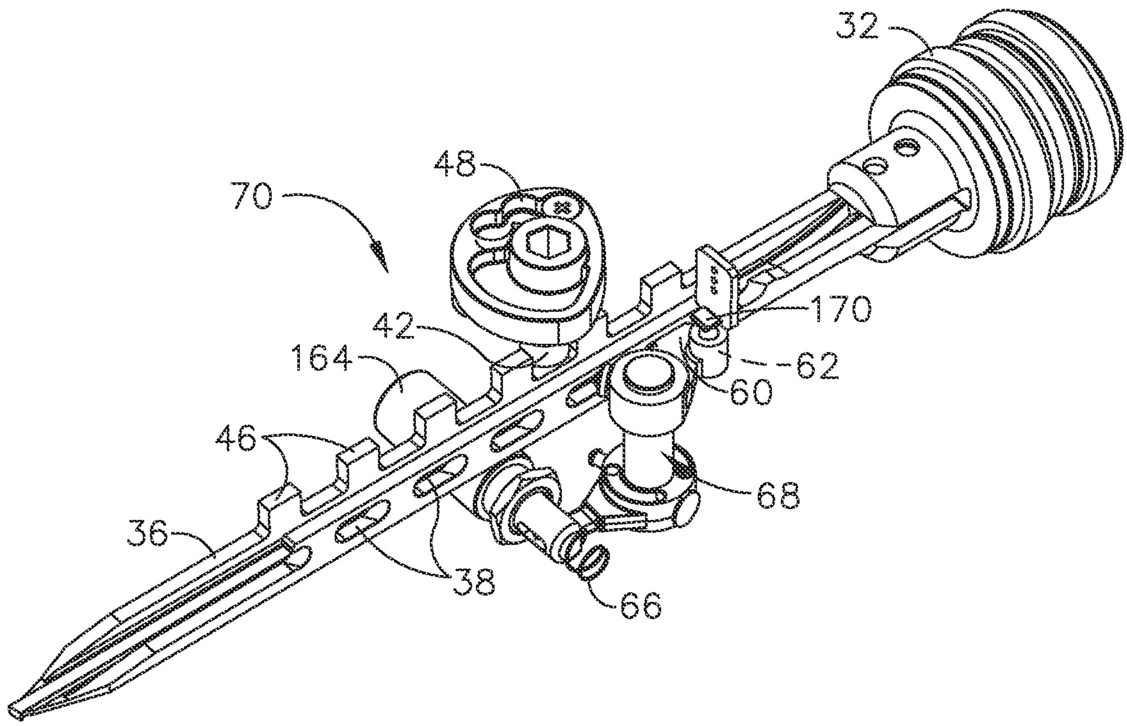
FIG. 11 is a perspective view of the piston, driver, lifter, and latch, depicting a latch engaged position of the fastener driving tool of FIG. 1.
Figure 12:
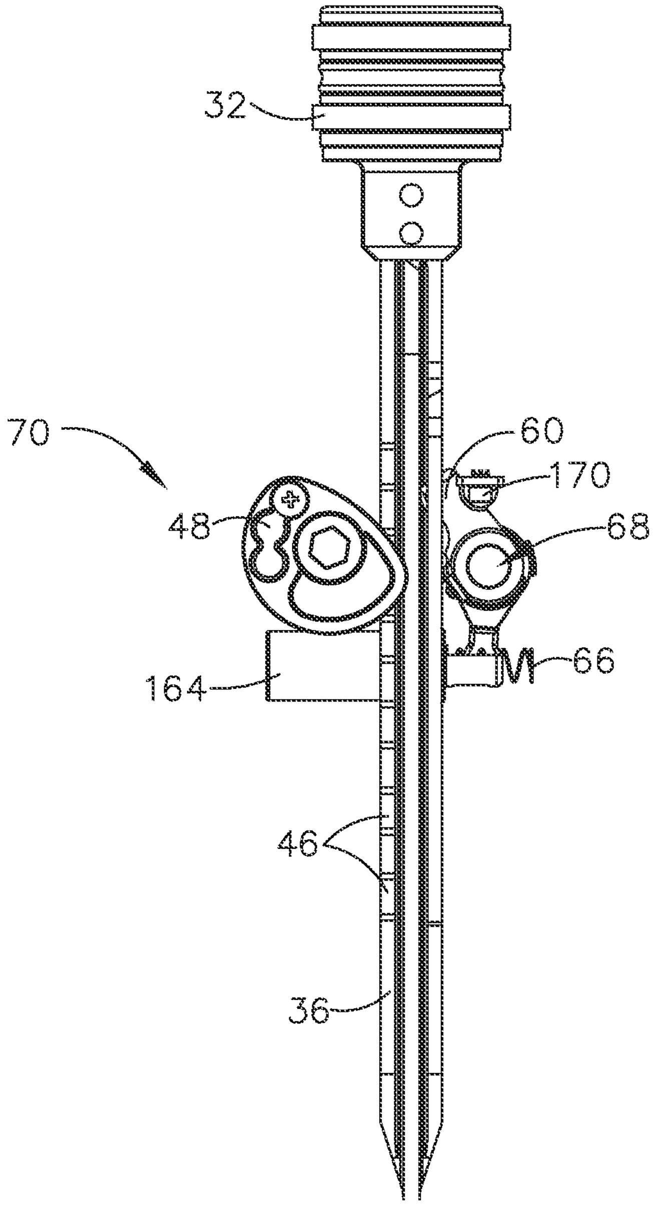
FIG. 12 is a front elevational view of the piston, driver, lifter, and latch, depicting a latch engaged position of the fastener driving tool of FIG. 1.
Figure 13:
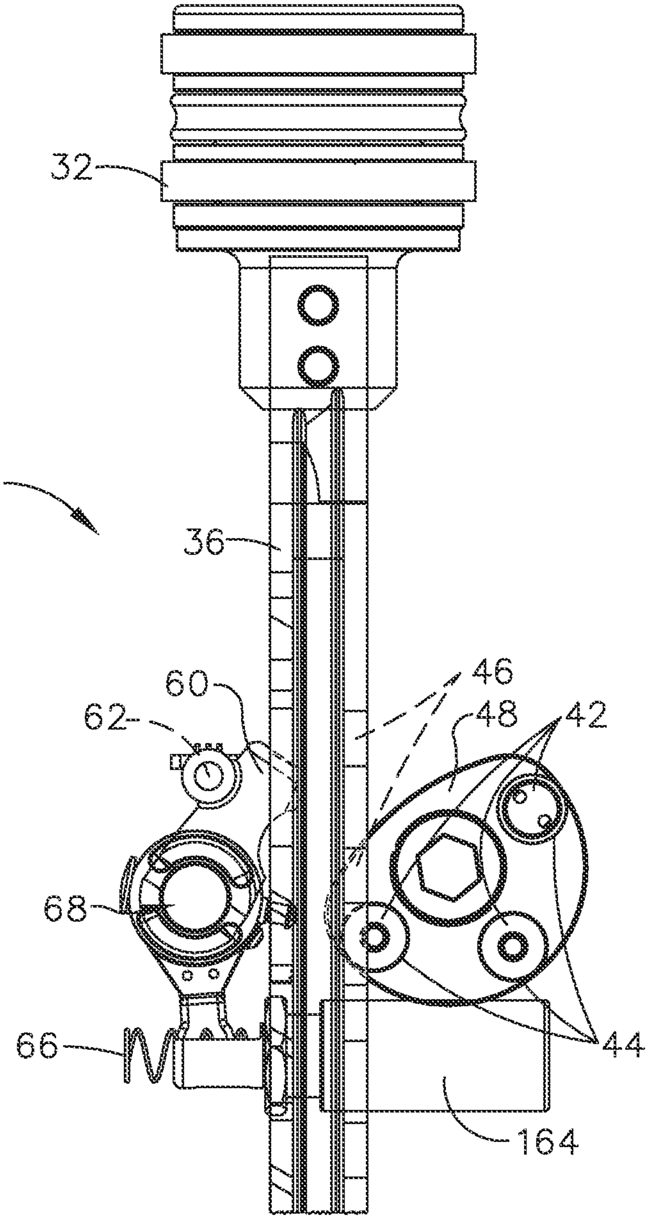
FIG. 13 is a rear elevational view of the piston, driver, lifter, and latch, depicting a latch engaged position of the fastener driving tool of FIG. 1.

Referring now to FIGS. 11-13, the driver machine S/A 70 is illustrated with the latch 60 in the engaged position. Here, the lifter pin 42 is safely positioned between two of the driver teeth 46 and is ready for a lift stroke. The latch magnet 62 is under the latch sensor 170, which means the sensor 170 communicates to the system controller 50 that the latch 60 is in the engaged position and the motor 40 should be energized to perform that lifting stroke.

FIG. 12 depicts how deep the latch 60 engages with the opening 38. The latch 60 provides a secure engagement in the event a lifter pin 42 does not properly engage one of the driver teeth 46. During a lift stroke, the lifter pins 42 routinely engage and slip off the driver teeth 46, as the lifter rotates in normal operation. The latch 60 ensures that the driver 36 doesn't slip during that lift cycle.

FIG. 13 illustrates again how securely the latch 60 engages into the opening 38 of the driver. Note also how secure the engagement is between the lifter pin 42 and the driver teeth 46. When the lifter rotates to begin a lifting stroke, the spring-loaded latch slips out of the driver opening 38, and then slides along the smooth side face of the driver until it encounters the next driver opening 38. But this "in and out" movement of the driver continues throughout the lifting stroke. However, if the driver should somehow be released by human error, the latch will catch the downward-moving driver at one of its openings 38, and hold it there.

Figure 14:
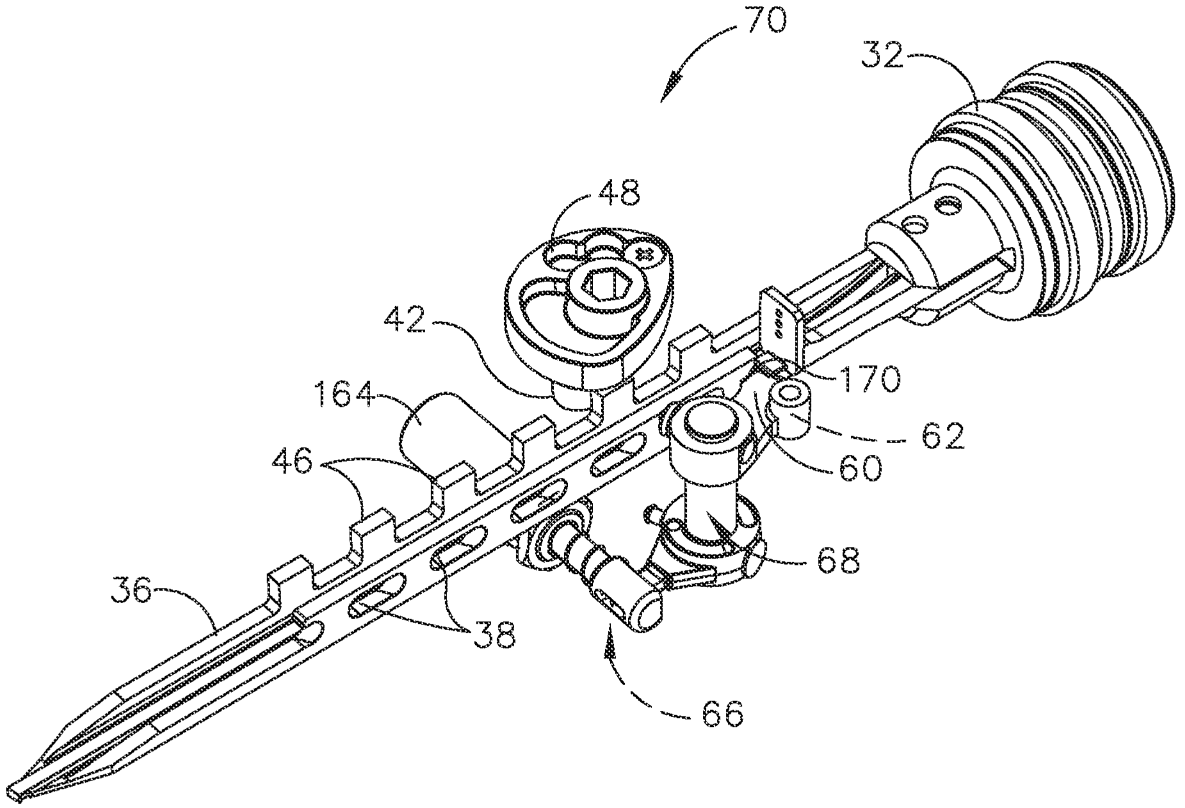
FIG. 14 is a perspective view of the piston, driver, lifter, and latch, depicting a latch misaligned position of the fastener driving tool of FIG. 1.
Figure 15:
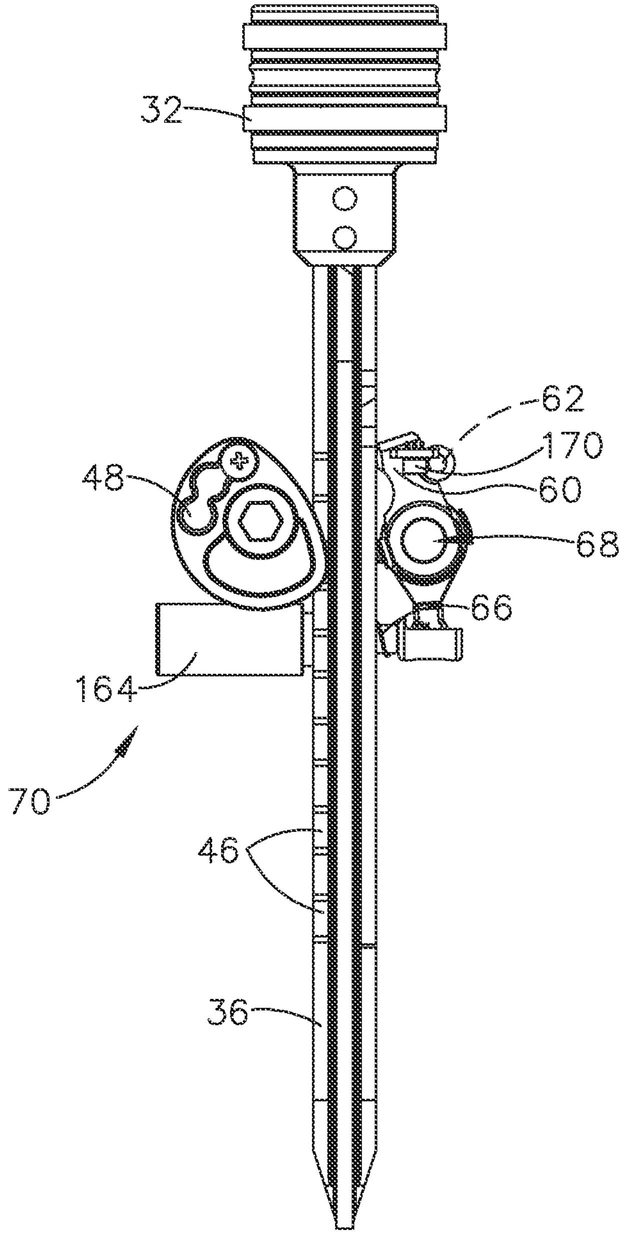
FIG. 15 is a front elevational view of the piston, driver, lifter, and latch, depicting a latch misaligned position of the fastener driving tool of FIG. 1.
Figure 16:
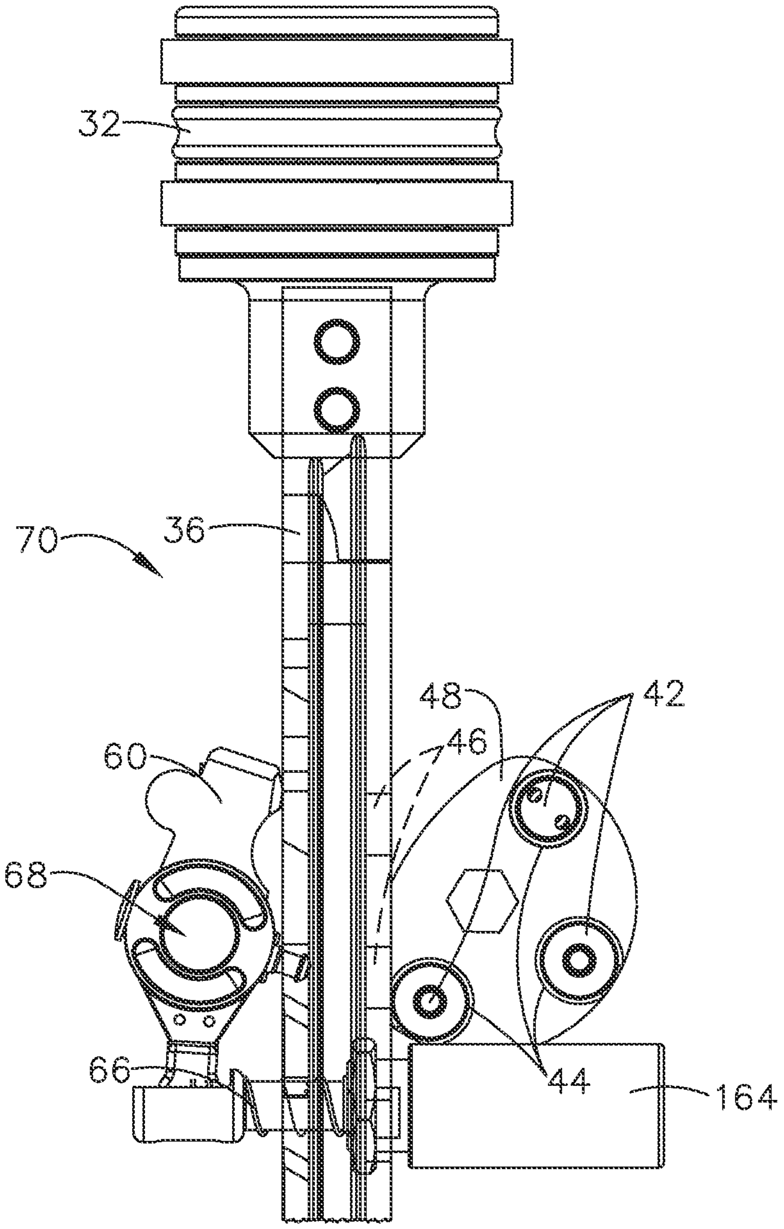
FIG. 16 is a rear elevational view of the piston, driver, lifter, and latch, depicting a latch misaligned position of the fastener driving tool of FIG. 1.

Referring now to FIGS. 14-16, the driver machine S/A 70 is in a misaligned position. The tool has attempted to drive a fastener; however, something occurred in a way that the driver 36 did not properly align with the lifter pins 42 or the latch 60 (for example, the driver 36 could have jammed, because a fastener became misaligned). Note that the latch 60 is not engaged with the opening 38, thereby preventing the latch magnet 62 from pivoting to its correct position within the detection field of the latch sensor 170. Therefore, the latch sensor 170 communicates with the system controller 50 that the latch is in a disengaged position, and therefore, the controller should energize the brake motor to prevent a lifting stroke.

FIG. 15 depicts the latch 60 touching the side face of the driver 36, instead of engaging in one of the openings 38. The misalignment between the latch sensor 170 and the latch magnet 62 is also depicted. FIG. 16 illustrates one of the lifter pins 42 touching a driver tooth 46. When the system controller detects this disengaged latch position, the lifter motor is de-energized, and the LEDs blink to indicate a jam. First, nothing is holding the driver 36 in place, since neither the latch 60 or a lifter pin 42 is engaged with an opening 38 or a driver tooth 46, respectively. Second, if the lifter 48 further rotated when in this state, it could cause damage to both the lifter pins 42 and the driver teeth 46, which could permanently damage the tool 10. This condition is the reason why the system controller's 50 knowledge of where the latch 60 is positioned (either engaged or misaligned) is important: to protect the user, and to prolong the life of the tool.

Figure 17:
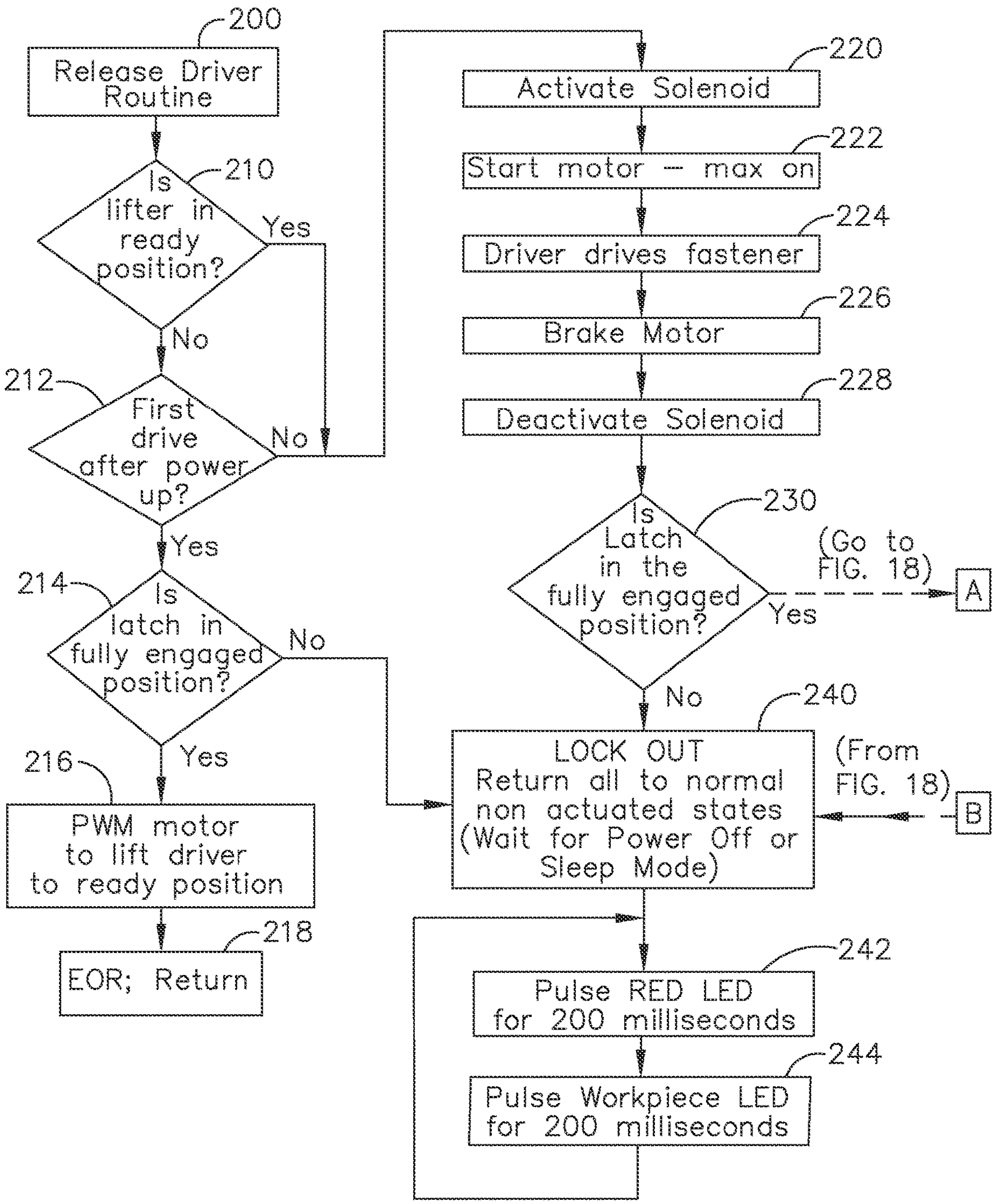
FIG. 17 is a flow chart showing some of the important logical steps performed by the controller of the fastener driving tool of FIG. 1, in which the driver is ready to drive a fastener.

Referring now to FIG. 17, a flowchart shows several steps in the operation of the tool relating to the drive sequence and the latch function. First, at a step 200 that begins a "Release Driver Routine," the user pulls the trigger 26 and presses the tool 10 against a substrate, which communicates to the system controller 50 that it should release the driver. Then, at a decision step 210, the controller 50 determines if the lifter is in the ready position. If it is, then the solenoid 164 is energized at a step 220. If the lifter is not in the ready position, then at a decision step 212 the controller 50 determines if this is the first drive after power up. If not, then the solenoid 164 is energized at step 220. However, if it is the first drive after power up, then at a decision step 214 the controller 50 determines if the latch is fully engaged. If yes, then the controller 50 energizes the motor to lift the driver to the ready position at a step 216. After lifting the driver to the ready position, at a step 218, the routine ends, and the logic returns to other tasks.

On the other hand, if the logic flow is now in the other branch at step 220, in which the solenoid was energized to disengage the latch, the controller 50 then starts the motor at a step 222 (at a "max on" 100% duty cycle). This action moves the lifter a small amount, which releases the driver at a step 224, and the driver drives the fastener. Next, at a step 226, the controller 50 de-energizes the motor to start slowing the lifter. At a step 228, the controller 50 communicates to the latch solenoid and allows it to return to the biased "locked" position—i.e., the solenoid is de-energized, which releases the latch so that its spring-loading will pivot the latch toward the driver. Then, at a decision step 230, the controller 50 determines if the latch is in the fully engaged position. If yes, then the controller 50 goes to step "A" to continue that branch of the logic flow (see FIG. 18). If no, then at a step 240 the system enters a "LOCK OUT" mode.

Note that at step 214, if the latch is not in the fully engaged position, the system also enters the LOCK OUT mode at this same step 240. The LOCK OUT mode forces the tool to return all functions to a normal non-actuated state. The system controller 50 instructs a red LED to pulse that is visible to a user, at a step 242. Additionally, at a step 244, the system controller 50 instructs a different LED to also pulse. These pulsing LEDs continue until the tool is powered off or goes into sleep mode. As a practical note, the user may simply pull the battery out, for example. However, until the system is powered off the tool cannot be used.

Figure 18:
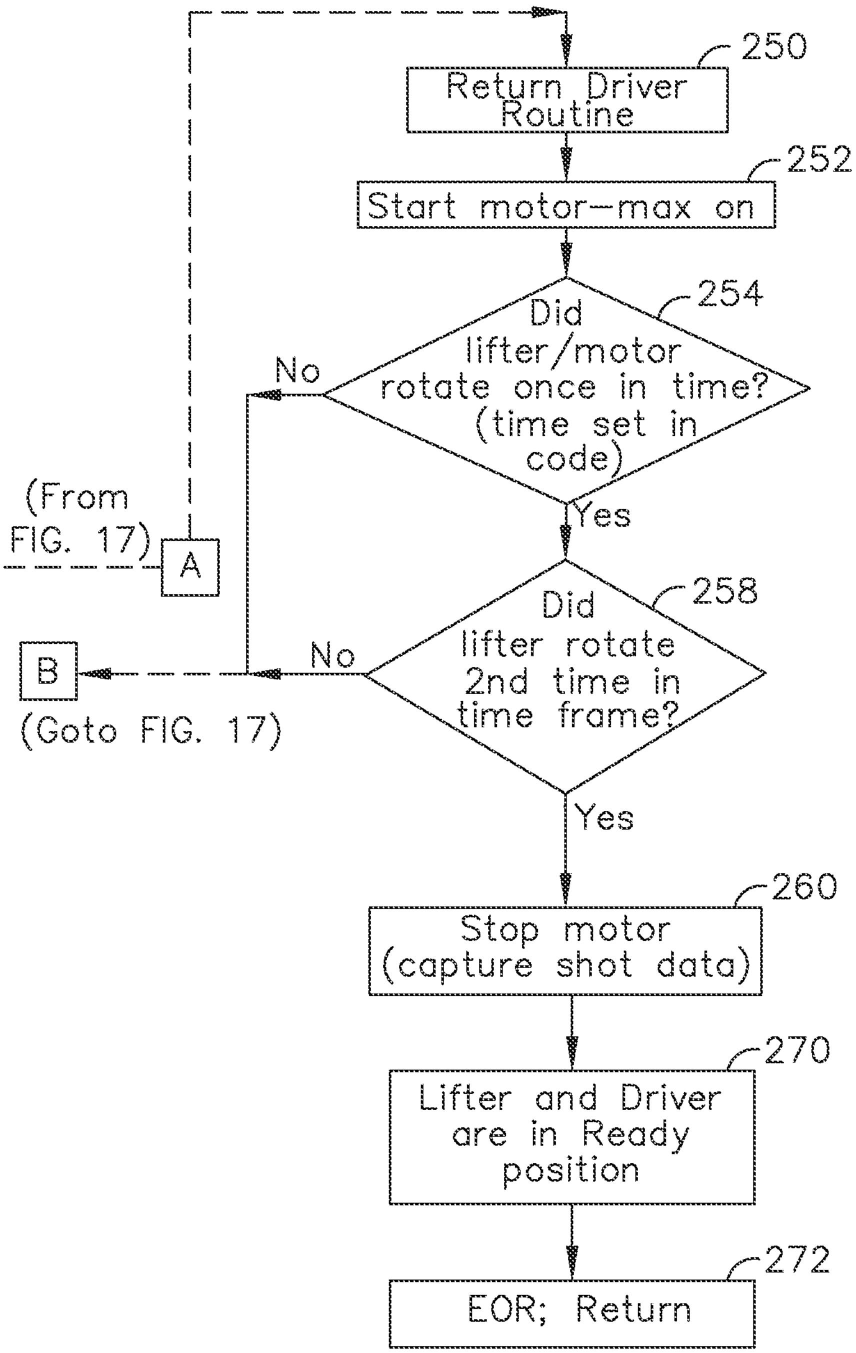
FIG. 18 is a flow chart showing some of the important logical steps performed by the controller of the fastener driving tool of FIG. 1, in which the lifter is ready to return the driver to a ready position.

Referring now to FIG. 18, the logic flow at step A (from FIG. 17) is directed to a step 250, where the system controller 50 begins the Driver Return Routine. (This could also be referred to as the "Driver Lift Routine.") First, at a step 252, the controller 50 energizes the motor (again, at a "max on" 100% duty cycle). Then, at a decision step 254, the controller 50 determines if the lifter has rotated once "in time." This "time" variable is set in the code programmed into the system controller memory (as determined by the tool's system designer). If it did not, then the controller logic moves to step "B" (see FIG. 17), which in turn returns to the LOCK OUT mode at step 240.

However, if one rotation "in time" properly occurred, then at a decision step 258, the controller 50 determines if the lifter rotated a second time in the proper time frame. Again, this "time" variable is set in the code programmed into the system controller memory. If the result is yes, then at a step 260 the controller 50 stops the motor, and captures shot data. (The lifting stroke has successfully completed.) If not, then the controller logic moves to step B, again (see FIG. 17). After stopping the motor in step 260, the controller moves to a step 270, and the lifter and driver have reached the "Ready" position.

At step 270, the latch 60 should now be inserted into one of the driver openings 38, to act as a safety device that will prevent the driver from "shooting" at an inappropriate time. As discussed above, the latch will have to be withdrawn from the opening 38 (by action of the solenoid) before the next driving stroke may occur. The logic flow is now directed to a step 272, which is the end of this routine (EOR), and the logic returns to other tasks.

Alternatively, at step 270, the latch 60 may instead rest on the driver 36 edge. In this configuration, the driver 36 is being held in the ready position solely by one of the lifter pins 42. However, if the driver 36 does slip off the lifter pin 42, the driver 36 will not move far until the latch 60 does move into engagement with one of the openings 38.

Note that some of the embodiments illustrated herein do not have all of their components included on some of the figures herein, for purposes of clarity. To see examples of such outer housings and other components, especially for earlier designs, the reader is directed to other U.S. patents and applications owned by Senco. Similarly, information about "how" the electronic controller operates to control the functions of the tool is found in other U.S. patents and applications owned by Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, 8,602,282, 9,676,088, 10,478,954, 9,993,913, 10,549,412, 10,898,994, 10,821,585 and 8,763,874; also published U.S. patent application No. 2020/0156228, published U.S. patent application No. 2021/0016424, published U.S. patent application No. 2020/0070330, and published U.S. patent application No. 2020/0122308. These documents are incorporated by reference herein, in their entirety.

It will be understood that the logical operations described in relation to the flow charts of FIGS. 17-18 can be implemented using sequential logic (such as by using microprocessor technology), or using a logic state machine, or perhaps by discrete logic; it even could be implemented using parallel processors. One preferred embodiment may use a microprocessor or microcontroller (e.g., microprocessor 150) to execute software instructions that are stored in memory cells. In fact, the entire microprocessor 150, along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a microcomputer, a microcontroller, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information, or perhaps by a type of memory device not yet invented. In general, the memory circuit of a particular electronic product will contain instructions that are executable by the processing circuit of that same particular electronic product.

It will also be understood that the precise logical operations depicted in the flow charts of FIGS. 17-18, and discussed above, could be somewhat modified to perform similar, although perhaps not exact, functions without departing from the principles of the technology disclosed herein. The exact nature of some of the decision steps and other commands in these flow charts are directed toward specific future models of automatic fastener driving tools (those involving FUSION Senco nailers or screwdriving tools, for example) and certainly similar, but somewhat different, steps would be taken for use with other models or brands of fastener driving tools in many instances, with the overall inventive results being the same.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A driver machine for use in a fastener driving tool, said driver machine comprising:

(a) a hollow cylinder having a movable piston therewithin;

(b) a guide body that is sized and shaped to receive a fastener that is to be driven;

(c) an elongated driver that is in mechanical communication with said piston at least during a driving stroke, said driver being sized and shaped to push said fastener from an exit portion of said guide body, said driver extending from a first end to a second end and having an elongated face therebetween, said first end being proximal to said piston, said second end being distal from said piston and making contact with said fastener during said driving stroke, said driver exhibiting a plurality of protrusions at first predetermined locations in a first surface of the driver; said driver having a plurality of through-holes in a second surface of the driver at second predetermined locations, in which each of said plurality of through-holes exhibits a predetermined size and shape;

(d) a movable lifter that moves said driver toward a ready position during a return stroke, by mechanically engaging with said plurality of protrusions of the driver; and (e) a movable latch that is biased so that a first portion of the latch mechanically engages against said second surface of the driver at least during said return stroke;

(f) wherein:

(i) after said driving stroke, when said driver has stopped its movement at a location that is within at least one predetermined "in specification" position, then said biased latch is operable to move such that said first portion of the latch is moved into one of said plurality of through-holes in said driver, before initiation of said return stroke; and (ii) after said driving stroke, when said driver has stopped its movement at a location that is not within said at least one predetermined "in specification" position, then said first portion of the latch cannot move into one of said plurality of through-holes in said driver;

in which said latch includes a second portion that is to be used for determining a position of the latch; and further comprising:

(g) a sensor mounted proximal to said second portion of the latch, so as to detect whether or not the biased latch has moved, after said driving stroke; and (h) a system controller comprising: (i) a processing circuit, (ii) a memory circuit including instructions executable by said processing circuit, (iii) an input/output interface (I/O) circuit, said I/O circuit being in communication with said sensor so that an output signal produced by said sensor is signal-conditioned as a latch position signal when received at said processing circuit;

(i) wherein: said system controller is operable to detect a position of said latch after said driving stroke, based upon a status of said latch position signal; and:

(i) when the first portion of the latch is moved into one of said plurality of through-holes in said driver, then said sensor will detect said second portion of the latch, and said return stroke will be permitted by the system controller to occur; and (ii) when the first portion is not moved into one of said plurality of through-holes in said driver, then said sensor will not detect said second portion of the latch, and said return stroke will be prevented by the system controller from occurring.

2. The driver machine of claim 1, wherein: said second portion of the latch comprises at least a protrusion, and said sensor comprises an optical sensor that is positioned to detect a movement of the latch's second portion.

3. The driver machine of claim 1, wherein: said second portion of the latch comprises at least a permanent magnet, and said sensor comprises a magnetic sensor that is positioned to detect a movement of the latch's second portion.

4. The driver machine of claim 1, wherein:

said plurality of through-holes in said second surface of the driver are located in said elongated face of the driver; and said plurality of protrusions in said first surface of the driver are located along a longitudinal edge of the driver.

5. The driver machine of claim 1, wherein:

said second predetermined locations of the plurality of through-holes are positioned in said second surface of the driver such that, when said first portion of the latch is able to move into one of said plurality of through-holes, then the driver is located such that, as determined by the system controller, it is safe to lift said driver.

6. A driver machine for use in a fastener driving tool, said driver machine comprising:

(a) a hollow cylinder having a movable piston therewithin;

(b) a guide body that is sized and shaped to receive a fastener that is to be driven;

(c) an elongated driver that is in mechanical communication with said piston at least during a driving stroke, said driver being sized and shaped to push said fastener from an exit portion of said guide body, said driver extending from a first end to a second end and having an elongated face therebetween, said first end being proximal to said piston, said second end being distal from said piston and making contact with said fastener during said driving stroke, said driver exhibiting a plurality of protrusions at first predetermined locations in a first surface of the driver; said driver having a plurality of through-holes in a second surface of the driver at second predetermined locations, in which each of said plurality of through-holes exhibits a predetermined size and shape;

(d) a movable lifter that moves said driver toward a ready position during a return stroke, by mechanically engaging with said plurality of protrusions of the driver; and (e) a movable latch that is biased so that a first portion of the latch mechanically engages against said second surface of the driver at least during said return stroke; and said latch includes a second portion that is to be used for determining a position of the latch;

(f) a sensor mounted proximal to said second portion of the latch, so as to detect whether or not the biased latch has moved, after said driving stroke; and (g) a system controller comprising: (i) a processing circuit, (ii) a memory circuit including instructions executable by said processing circuit, (iii) an input/output interface (I/O) circuit, said I/O circuit being in communication with said sensor so that an output signal produced by said sensor is signal-conditioned as a latch position signal when received at said processing circuit;

(h) wherein: said system controller is operable to detect a position of said latch after said driving stroke, based upon a status of said latch position signal; and:

(i) when the first portion of the latch is moved into one of said plurality of through-holes in said driver, then said sensor will detect said second portion of the latch, and said return stroke will be permitted by the system controller to occur; and (ii) when the first portion is not moved into one of said plurality of through-holes in said driver, then said sensor will not detect said second portion of the latch, and said return stroke will be prevented by the system controller from occurring;

(iii) after said driving stroke, when said driver has stopped its movement at a location that allows said first portion of the biased latch to move into one of said plurality of through-holes in said driver, then, as determined by the system controller, it is safe to lift said driver and initiate said return stroke; and (iv) after said driving stroke, when said driver has stopped its movement at a location that does not allow said first portion of the biased latch to move into one of said plurality of through-holes in said driver, then, as determined by the system controller, it is not safe to lift said driver for said return stroke.

7. The driver machine of claim 6, wherein: said second portion of the latch comprises at least a protrusion, and said sensor comprises an optical sensor that is positioned to detect a movement of the latch's second portion.

8. The driver machine of claim 6, wherein: said second portion of the latch comprises at least a permanent magnet, and said sensor comprises a magnetic sensor that is positioned to detect a movement of the latch's second portion.

9. The driver machine of claim 6, wherein:

said plurality of through-holes in said second surface of the driver are located in said elongated face of the driver; and said plurality of protrusions in said first surface of the driver are located along a longitudinal edge of the driver.

10. A driver machine for use in a fastener driving tool, said driver machine comprising:

(a) a hollow cylinder having a movable piston therewithin;

(b) a guide body that is sized and shaped to receive a fastener that is to be driven;

(c) an elongated driver that is in mechanical communication with said piston at least during a driving stroke, said driver being sized and shaped to push said fastener from an exit portion of said guide body, said driver extending from a first end to a second end and having an elongated face therebetween, said first end being proximal to said piston, said second end being distal from said piston and making contact with said fastener during said driving stroke, said driver exhibiting a plurality of protrusions at first predetermined locations in a first surface of the driver; said driver having a plurality of openings in a second surface of the driver at second predetermined locations, wherein each of said plurality of openings exhibits a predetermined size and shape;

(d) a movable lifter that moves said driver toward a ready position during a return stroke, by mechanically engaging with said plurality of protrusions of the driver; and (e) a movable latch that is biased so that a first portion of the latch mechanically engages against said second surface of the driver at least during said return stroke, wherein said latch includes a second portion that is to be used for determining a position of the latch;

(f) a sensor mounted proximal to said second portion of the latch, so as to detect whether or not the biased latch has moved, after said driving stroke; and (g) a system controller comprising: (i) a processing circuit, (ii) a memory circuit including instructions executable by said processing circuit, (iii) an input/output interface (I/O) circuit, said I/O circuit being in communication with said sensor so that an output signal produced by said sensor is signal-conditioned as a latch position signal when received at said processing circuit;

(h) wherein:

(i) after said driving stroke, when said driver has stopped its movement at a location that is within at least one predetermined "in specification" position, then said biased latch is operable to move such that said first portion of the latch is moved into one of said plurality of openings in said driver, before initiation of said return stroke; and (ii) after said driving stroke, when said driver has stopped its movement at a location that is not within said at least one predetermined "in specification" position, then said first portion of the latch cannot move into one of said plurality of openings in said driver; and (i) wherein: said system controller is operable to detect a position of said latch after said driving stroke, based upon a status of said latch position signal; and:

(i) when the first portion of the latch is moved into one of said plurality of openings in said driver, then said sensor will detect said second portion of the latch, and said return stroke will be permitted by the system controller to occur; and (ii) when the first portion is not moved into one of said plurality of openings in said driver, then said sensor will not detect said second portion of the latch, and said return stroke will be prevented by the system controller from occurring.

11. The driver machine of claim 10, wherein: said second portion of the latch comprises at least a protrusion, and said sensor comprises an optical sensor that is positioned to detect a movement of the latch's second portion.

12. The driver machine of claim 10, wherein: said second portion of the latch comprises at least a permanent magnet, and said sensor comprises a magnetic sensor that is positioned to detect a movement of the latch's second portion.

13. The driver machine of claim 10, wherein:

said plurality of openings in said second surface of the driver are located in said elongated face of the driver; and said plurality of protrusions in said first surface of the driver are located along a longitudinal edge of the driver.

14. The driver machine of claim 10, wherein:

said second predetermined locations of the plurality of openings are positioned in said second surface of the driver such that, when said first portion of the latch is able to move into one of said plurality of through-holes, then the driver is located such that, as determined by the system controller, it is safe to lift said driver.

* * * * *